United States Patent [19]

Takeda

[11] Patent Number: 5,319,771
[45] Date of Patent: Jun. 7, 1994

[54] CPU CLOCK GENERATOR HAVING A LOW FREQUENCY OUTPUT DURING I/O OPERATIONS AND A HIGH FREQUENCY OUTPUT DURING MEMORY OPERATIONS

[75] Inventor: Koji Takeda, Suwa, Japan

[73] Assignee: Seiko Epson Corporation, Tokyo, Japan

[21] Appl. No.: 52,801

[22] Filed: Apr. 26, 1993

Related U.S. Application Data

[63] Continuation of Ser. No. 522,211, May 10, 1990.

[30] Foreign Application Priority Data

| May 10, 1989 | [JP] | Japan | 1-116902 |
| May 29, 1989 | [JP] | Japan | 1-135302 |
| Jun. 1, 1989 | [JP] | Japan | 1-139701 |
| Jun. 1, 1989 | [JP] | Japan | 1-139702 |

[51] Int. Cl.⁵ ................................ G06F 1/08
[52] U.S. Cl. ................... 395/550; 364/DIG. 1; 364/270; 364/270.2
[58] Field of Search ....................... 395/275, 550

[56] References Cited

U.S. PATENT DOCUMENTS

| 4,136,383 | 1/1979 | Takesue | 395/375 |
| 4,366,540 | 12/1982 | Berglund et al. | 395/550 |
| 4,507,732 | 3/1985 | Catiller et al. | 395/275 |
| 4,631,702 | 12/1986 | Korba | 395/550 |
| 4,819,164 | 4/1989 | Branson | 395/550 |
| 5,125,088 | 6/1992 | Culley | 395/550 |
| 5,151,986 | 9/1992 | Langan et al. | 395/550 |
| 5,159,679 | 10/1992 | Culley | 395/550 |
| 5,163,146 | 11/1992 | Antanaitis, Jr. et al. | 395/550 |
| 5,179,667 | 1/1993 | Iyer | 395/275 |

Primary Examiner—Arthur G. Evans
Assistant Examiner—Lance Leonard Barry
Attorney, Agent, or Firm—Raymond J. Werner

[57] ABSTRACT

A computer system having a microprocessor that provides bus control signals indicative of bus transaction types such as memory read, memory write, I/O read, and I/O write, generates a variable frequency clock for use by the microprocessor. The computer system also includes a clock generator and a control circuit. The control circuit instructs the clock generator to provide one of a plurality of clock frequencies based on the type of bus transaction specified by the CPU's bus control signals. Typically, I/O transactions cause the control circuit to instruct the clock generator to provide a low frequency clock. In an alternative embodiment, address signals may be used in conjunction with the bus control signals to define which one of a plurality of clock frequencies shall be selected.

5 Claims, 38 Drawing Sheets

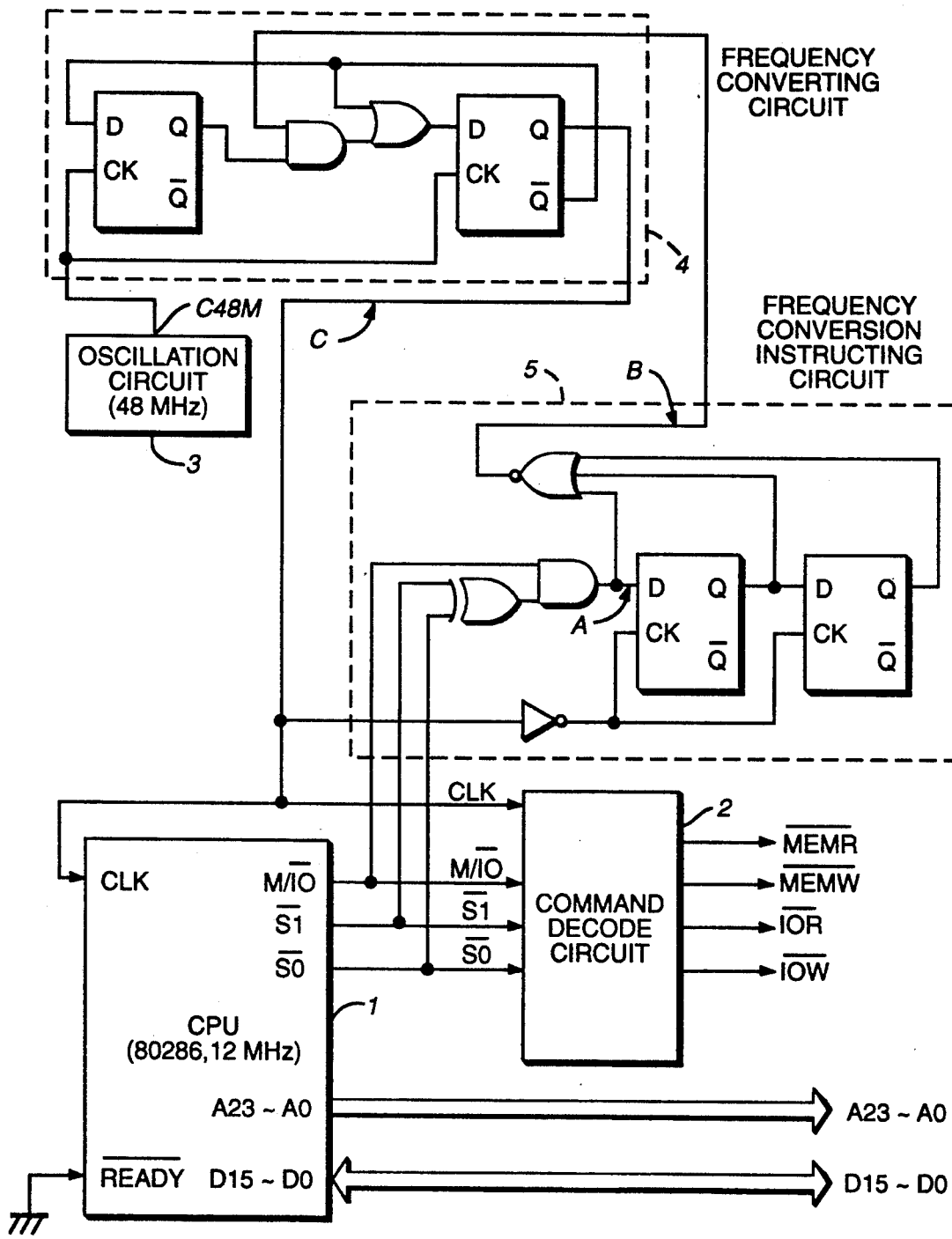
FIG._1

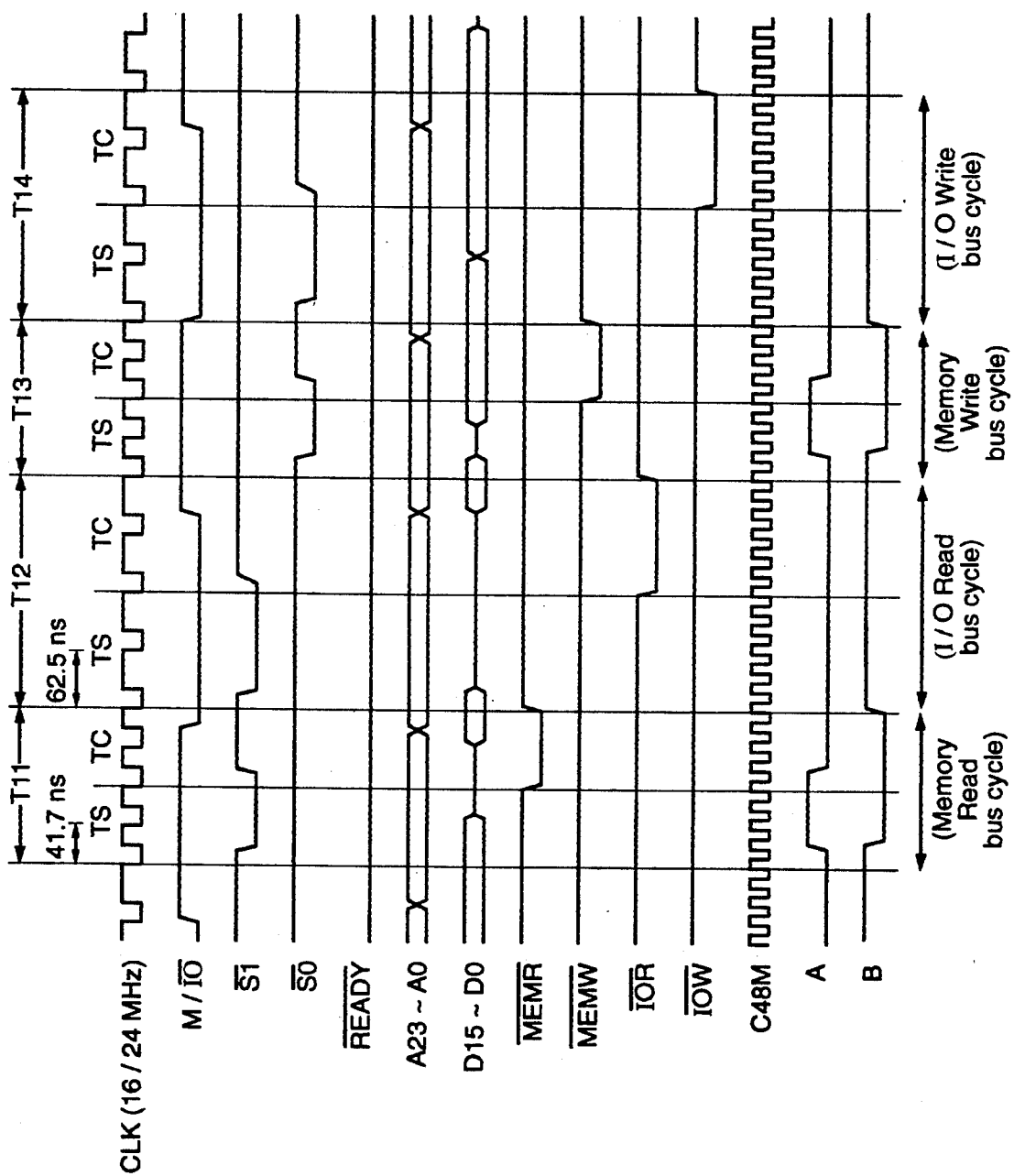
FIG._2

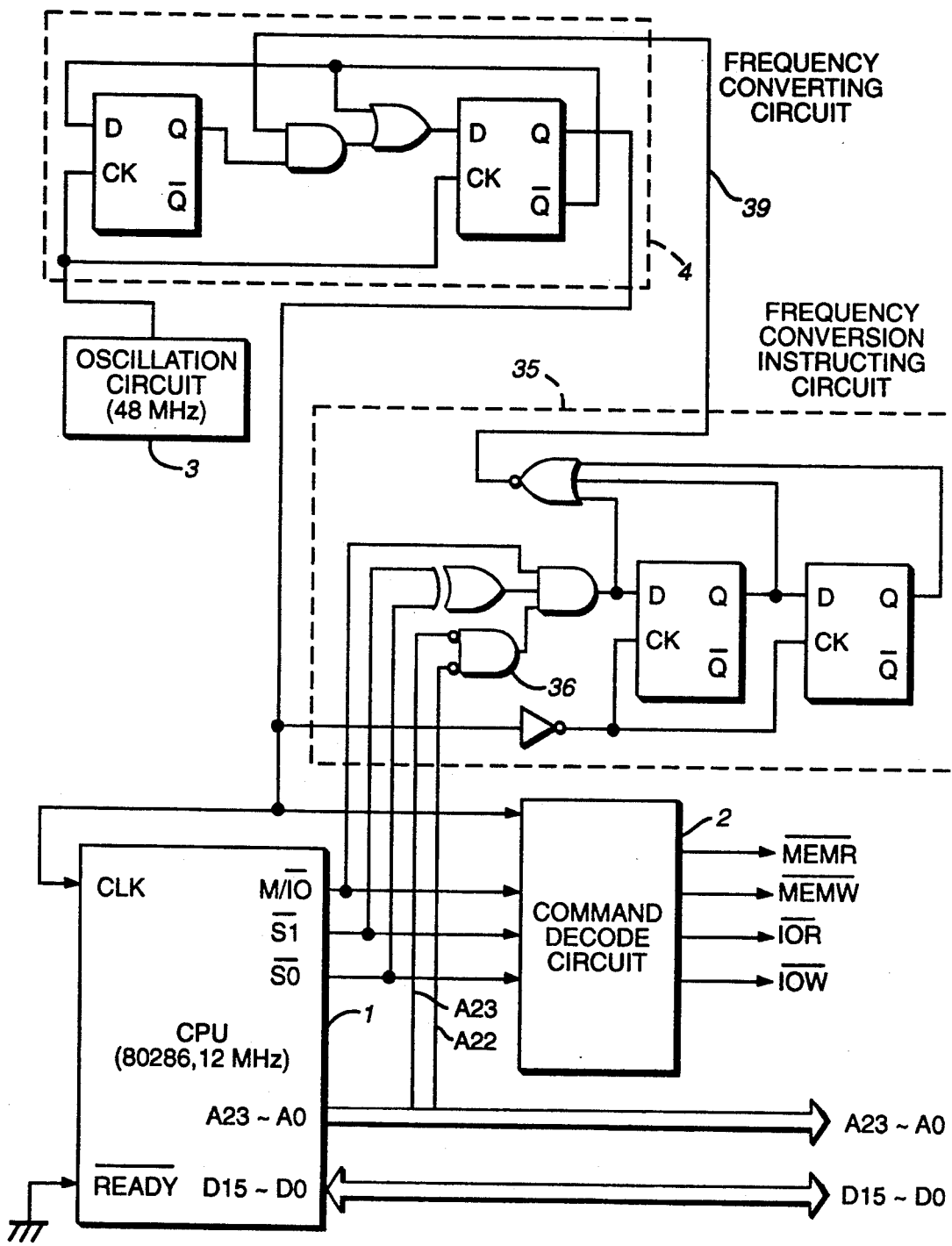
*FIG._3*

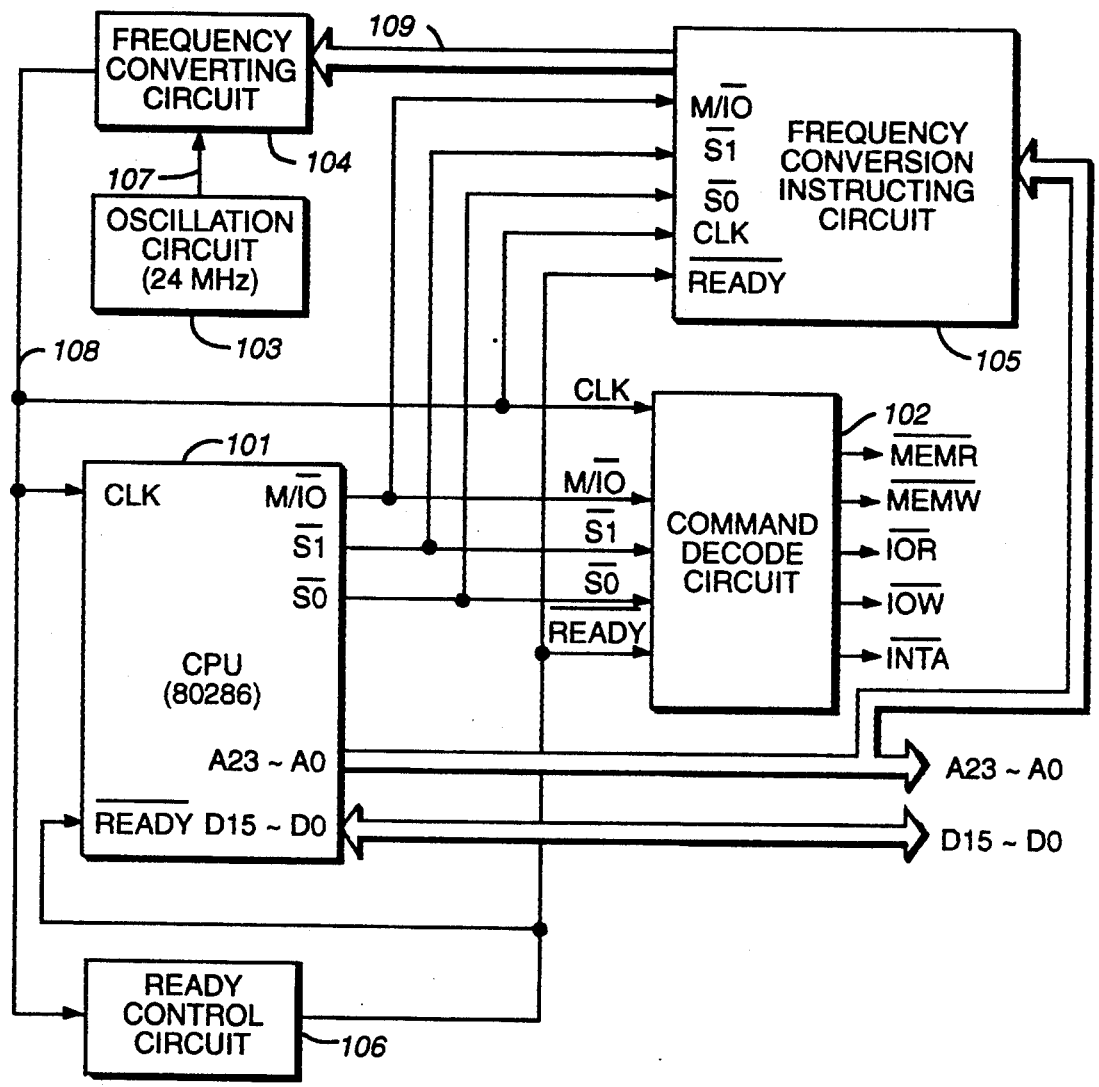
FIG._4

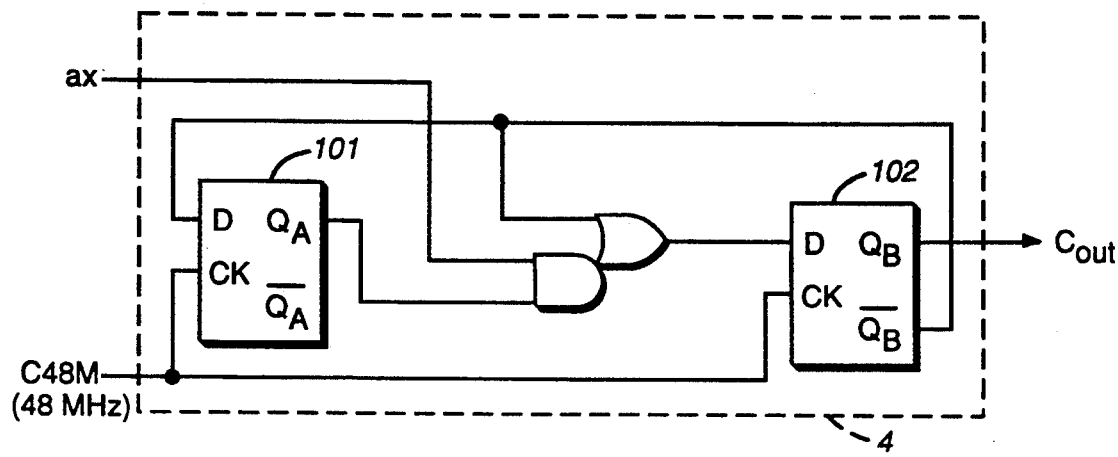
FIG._5A
| ax | C_out (FREQUENCY DIVIDING RATIO) |
|---|---|
| 0 | 24 MHz (1/2 DIVISION) |
| 1 | 16 MHz (1/3 DIVISION) |
FIG._5B
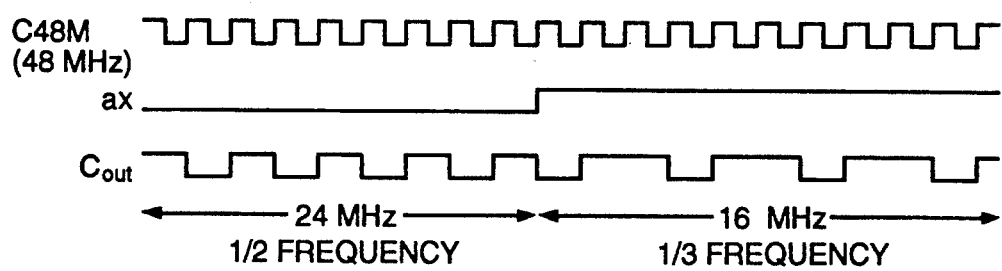
FIG._5C

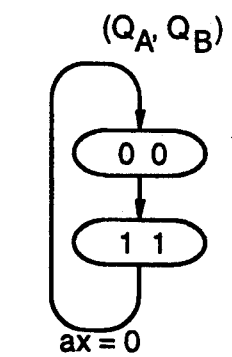
FIG._6A
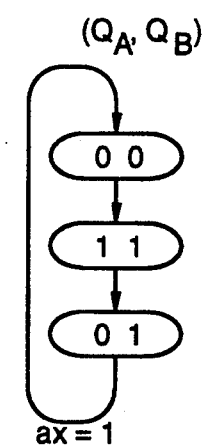
FIG._6B
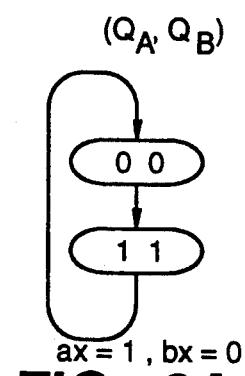
FIG._8A
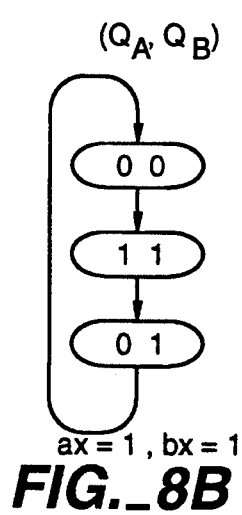
FIG._8B
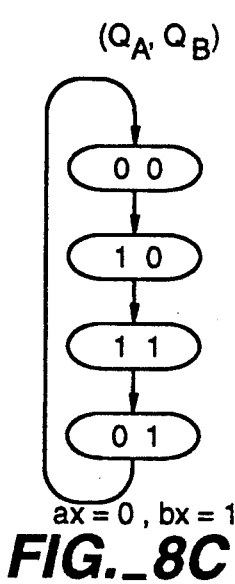
FIG._8C
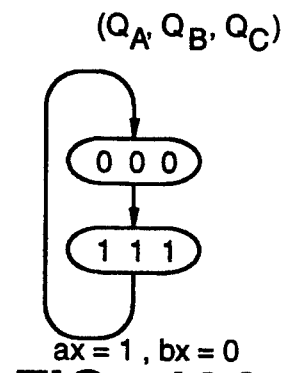
FIG._10A
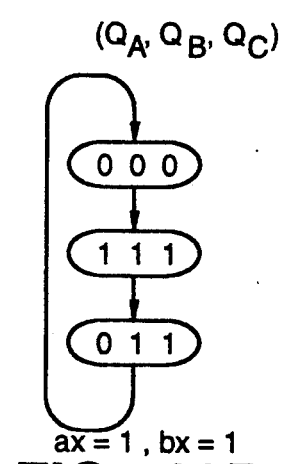
FIG._10B
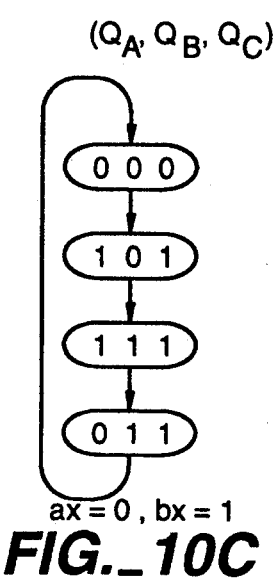
FIG._10C

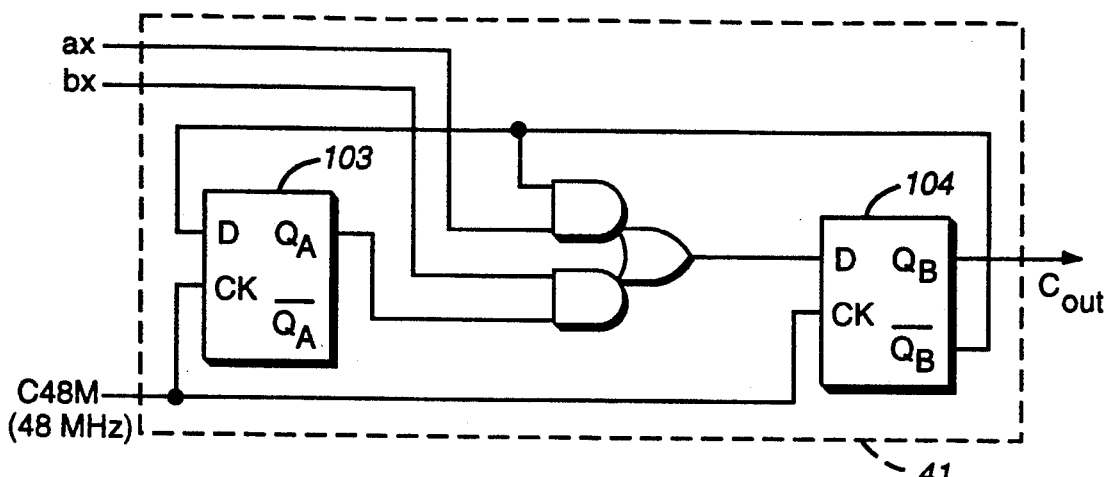
FIG.–7A
FIG._7B
| ax | bx | C_out |
|---|---|---|
| 0 | 0 | — |
| 0 | 1 | 12 MHz (1/4 DIVISION) |
| 1 | 0 | 24 MHz (1/2 DIVISION) |
| 1 | 1 | 16 MHz (1/3 DIVISION) |
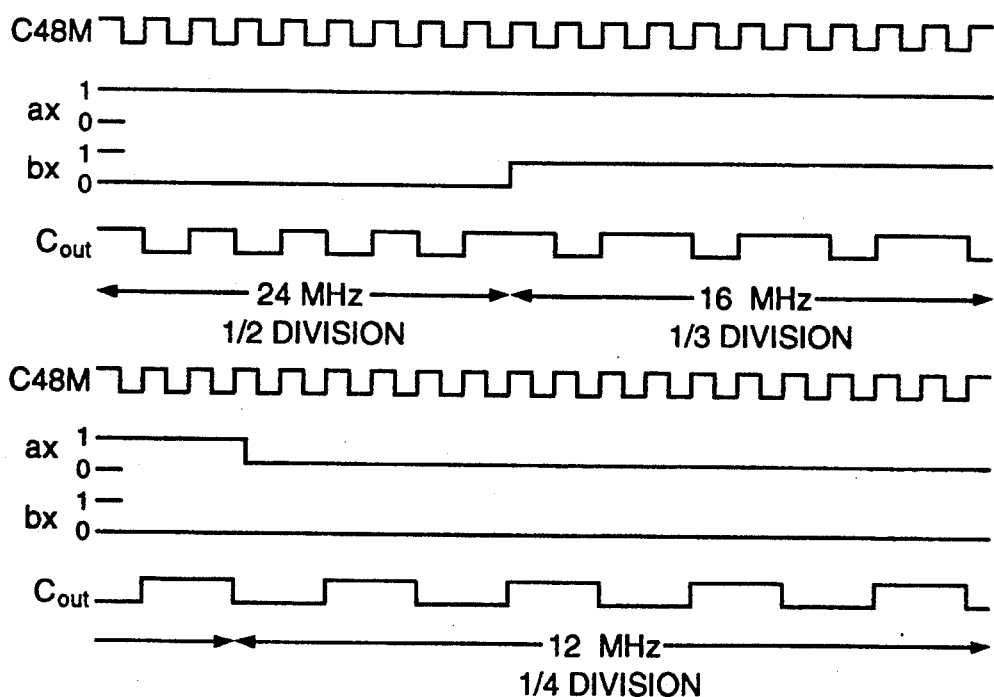
FIG._7C

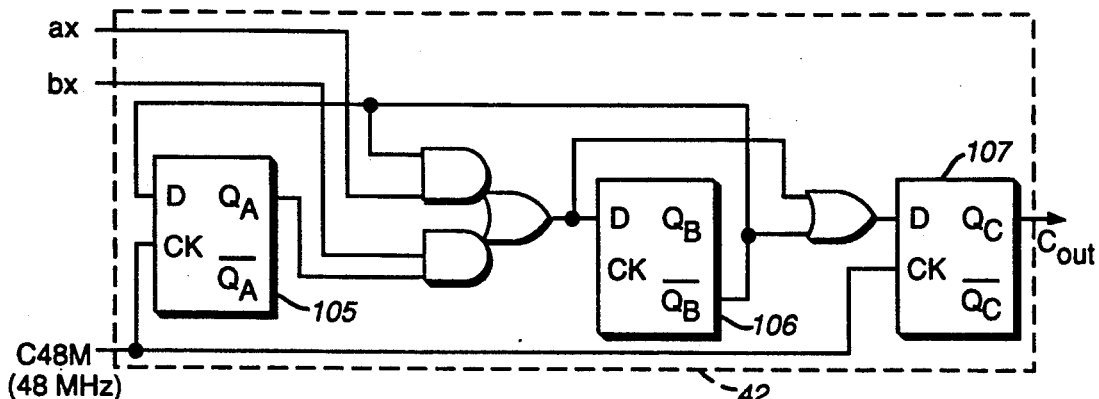
FIG._9A
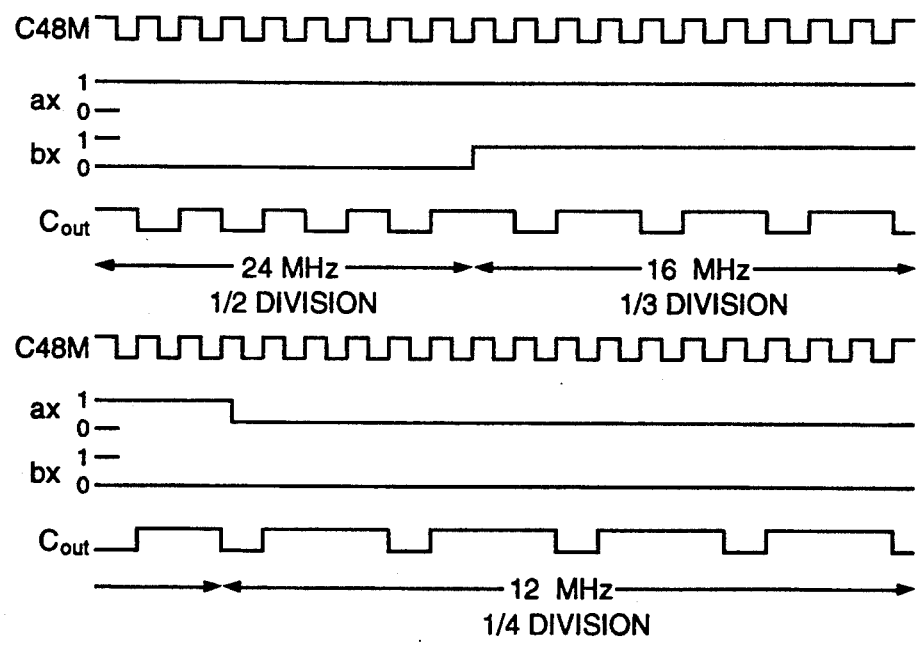
FIG._9B
| ax | bx | C$_{out}$ |
|---|---|---|
| 0 | 0 | — |
| 0 | 1 | 12 MHz (1/4 DIVISION) |
| 1 | 0 | 24 MHz (1/2 DIVISION) |
| 1 | 1 | 16 MHz (1/3 DIVISION) |
FIG._9C

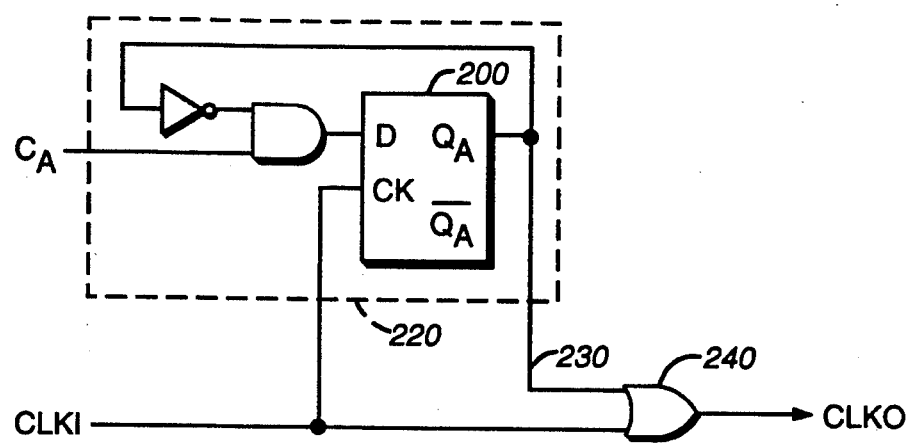
FIG._11A
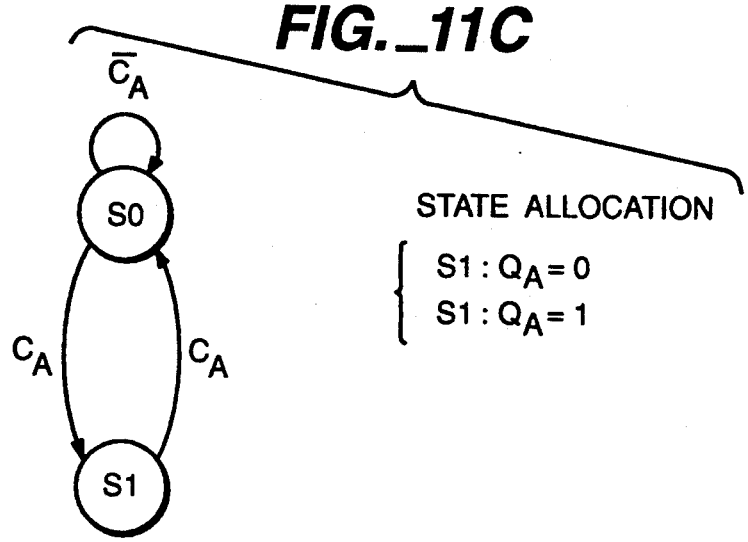
FIG._11B
FIG._11D
FIG._11C

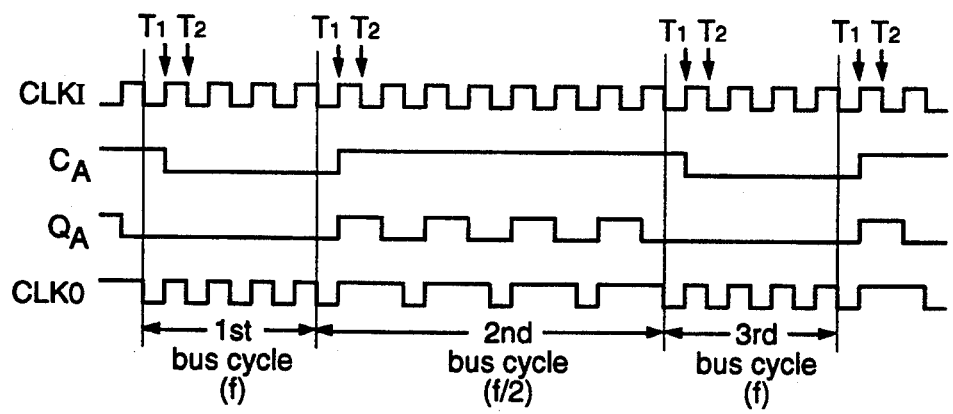
FIG._11E
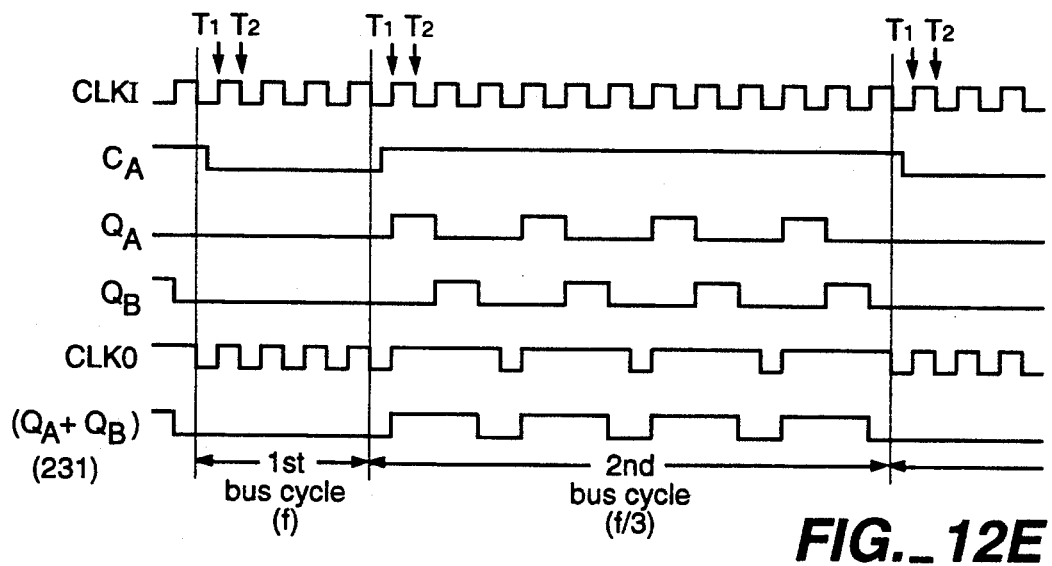
FIG._12E
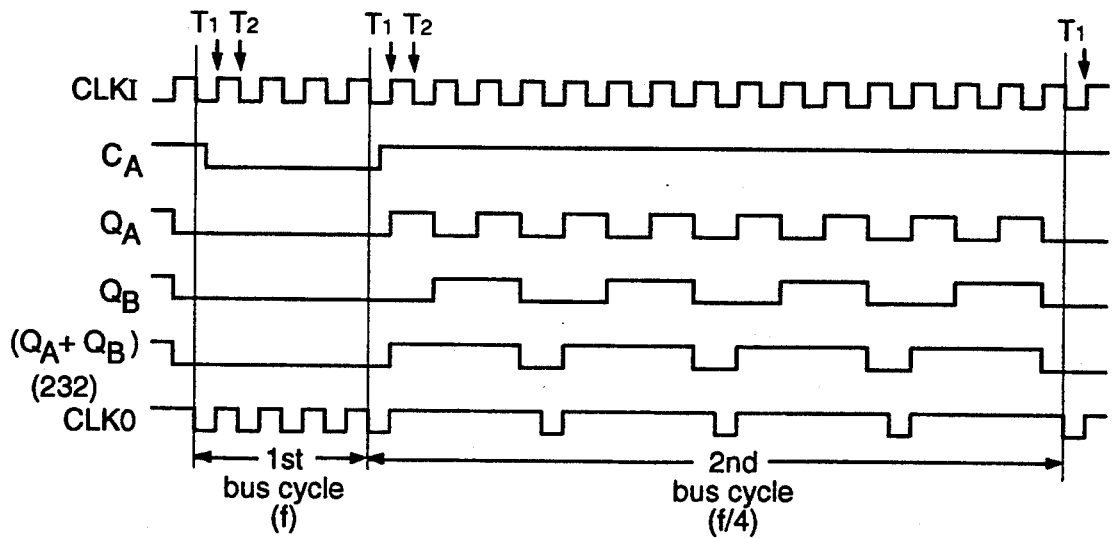
FIG._13E

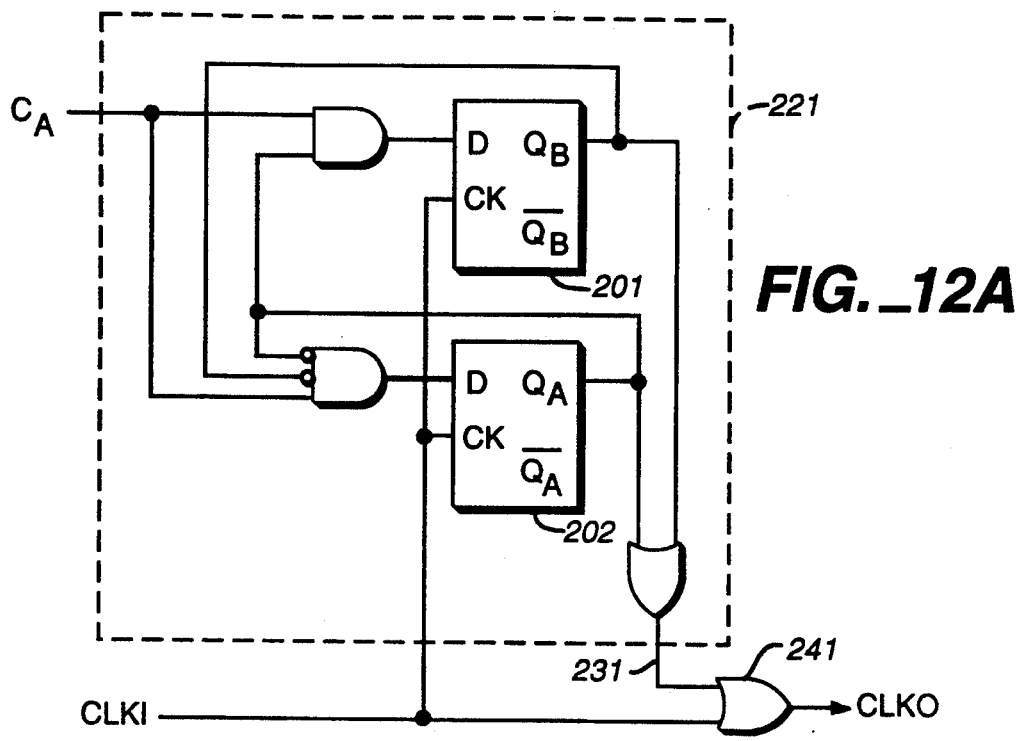
FIG._12A
| $C_A$ | CLKO FREQUENCY |
|---|---|
| 0 | f |
| 1 | f/3 |
CLKI FREQUENCY: f
FIG._12B
| $Q_B Q_A$ \ $C_A$ | 0 | 1 |
|---|---|---|
| 00 | 00 | 01 |
| 01 | ** | 10 |
| 11 | ** | ** |
| 10 | ** | 00 |
$$\begin{cases} Q_B^{(1)} = C_A \cdot \overline{Q_A} \\ Q_A^{(1)} = \overline{C_A} \cdot \overline{Q_B} \cdot \overline{Q_C} \end{cases}$$
FIG._12D
STATE ALLOCATION
$$\begin{cases} S0 : (Q_B, Q_A) = (0,0) \\ S1 : (Q_B, Q_A) = (0,1) \\ S2 : (Q_B, Q_A) = (1,0) \end{cases}$$
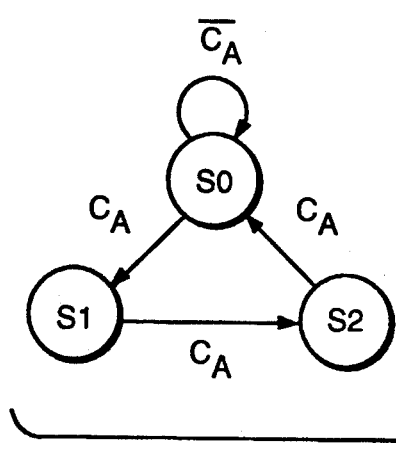
FIG._12C

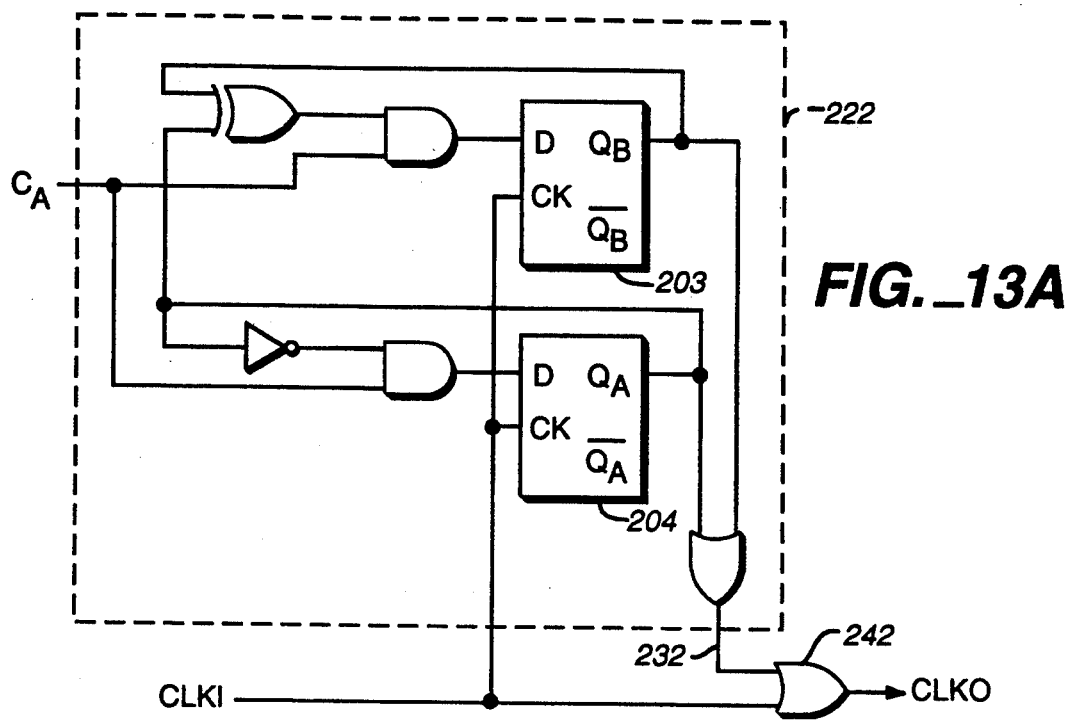
FIG._13A
FIG._13B
CLKI FREQUENCY: f
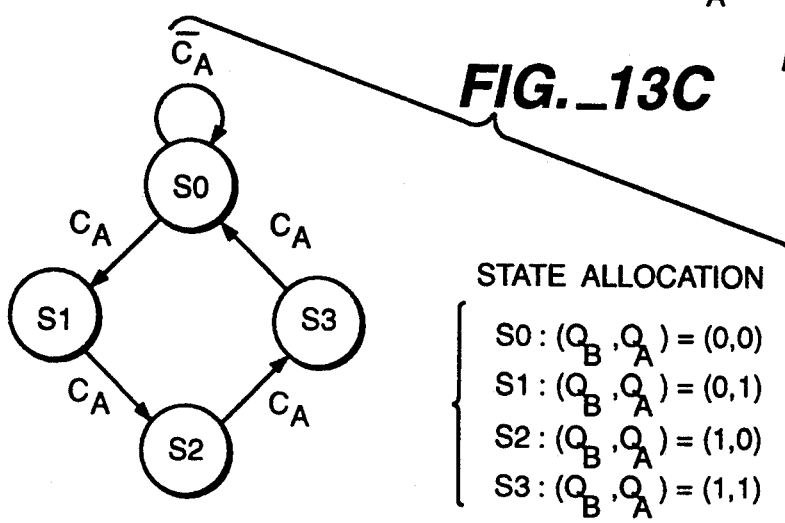
$$Q_B^{(1)} = (Q_B \oplus Q_A) \cdot C_A$$
$$Q_A^{(1)} = \overline{Q_A} \cdot C_A$$
FIG._13D
FIG._13C
STATE ALLOCATION
$$S0 : (Q_B, Q_A) = (0,0)$$
$$S1 : (Q_B, Q_A) = (0,1)$$
$$S2 : (Q_B, Q_A) = (1,0)$$
$$S3 : (Q_B, Q_A) = (1,1)$$

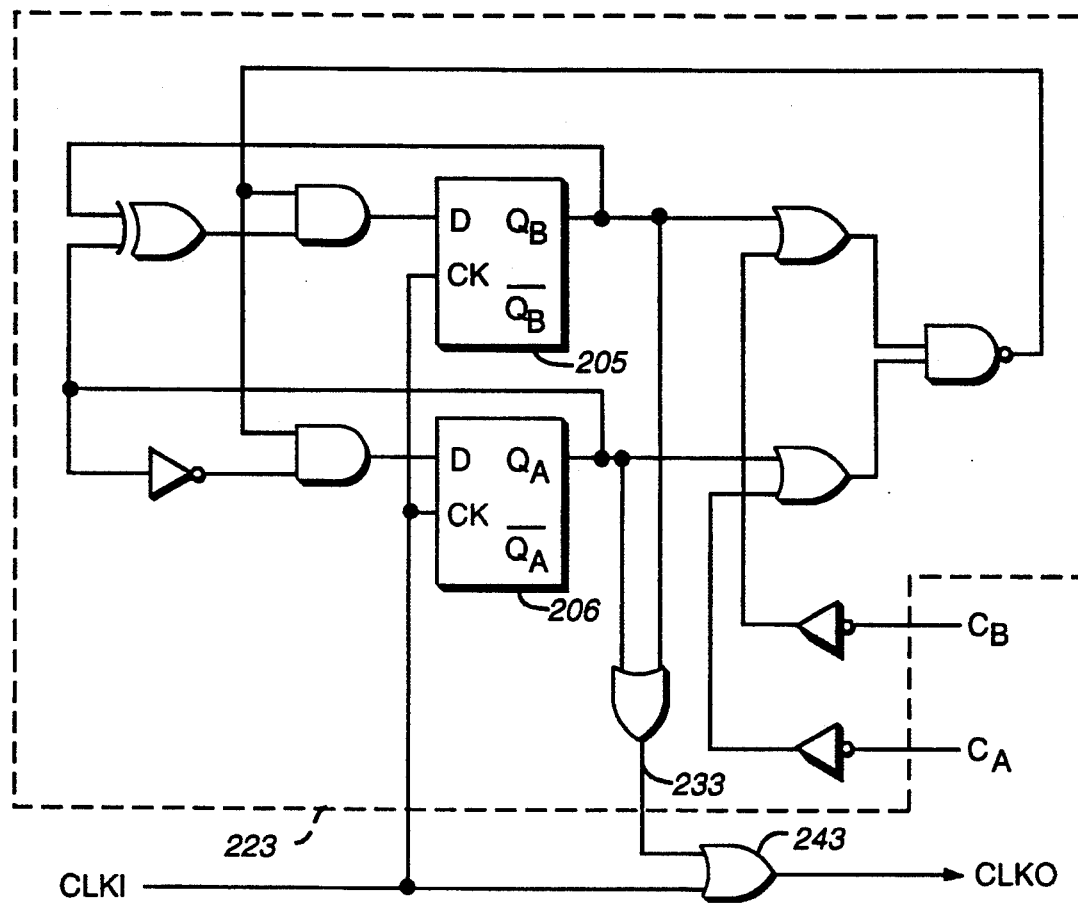
FIG._14A
| $C_B$ | $C_A$ | CLKO FREQUENCY |
|---|---|---|
| 0 | 0 | f |
| 0 | 1 | f/2 |
| 1 | 0 | f/3 |
| 1 | 1 | f/4 |
CLKI FREQUENCY: f
FIG._14B

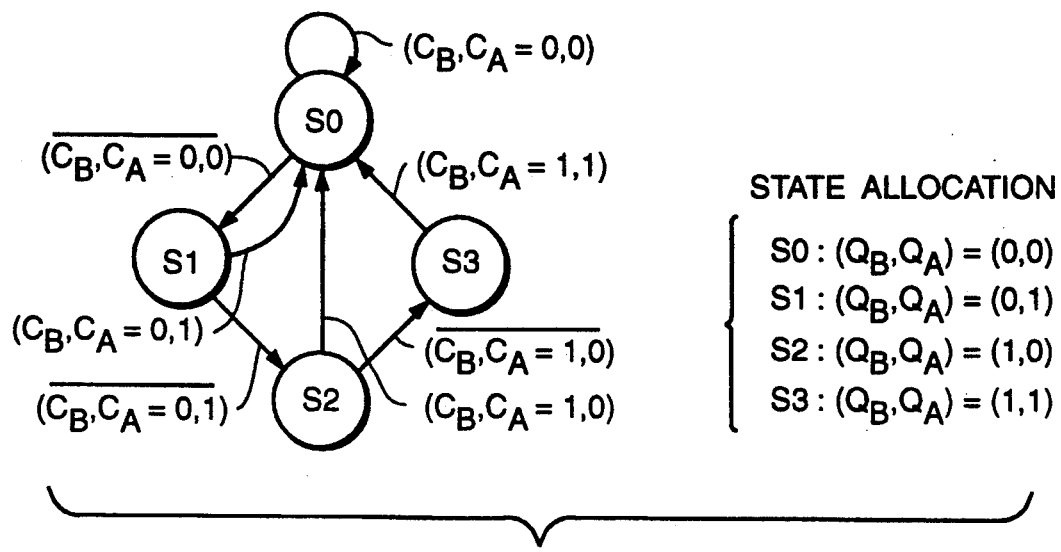
FIG._14C
STATE ALLOCATION
$$\begin{cases} S0 : (Q_B, Q_A) = (0,0) \\ S1 : (Q_B, Q_A) = (0,1) \\ S2 : (Q_B, Q_A) = (1,0) \\ S3 : (Q_B, Q_A) = (1,1) \end{cases}$$
$Q_B(1) \cdot Q_A(1)$ KARNAUGH MAP
| $Q_B Q_A$ \ $C_B C_A$ | 00 | 01 | 11 | 10 |
|---|---|---|---|---|
| 00 | 00 | 01 | 01 | 01 |
| 01 | ** | 00 | 10 | 10 |
| 11 | ** | ** | 00 | ** |
| 10 | ** | ** | 11 | 00 |
$$\begin{cases} Q_B(1) = (Q_B \oplus Q_A) \cdot (C_B \cdot \overline{Q_B} + C_A \cdot \overline{Q_A}) \\ Q_A(1) = \overline{Q_A} \cdot (C_B \cdot \overline{Q_B} + C_A \cdot \overline{Q_A}) \end{cases}$$
FIG._14D

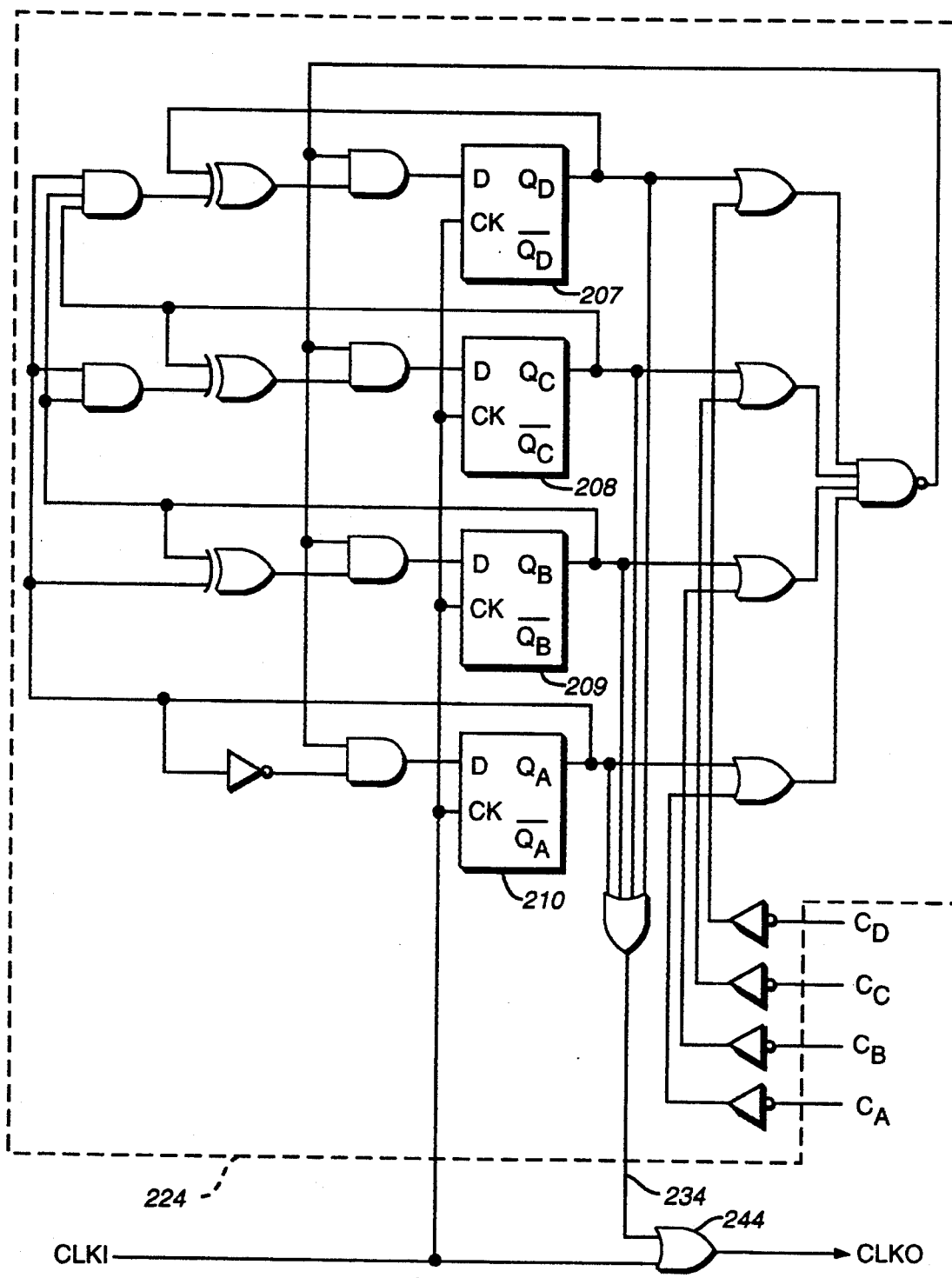
FIG._15A

| $C_D$ | $C_C$ | $C_B$ | $C_A$ | CLKO FREQUENCY |
|---|---|---|---|---|
| 0 | 0 | 0 | 0 | f |
| 0 | 0 | 0 | 1 | f/2 |
| 0 | 0 | 1 | 0 | f/3 |
| 0 | 0 | 1 | 1 | f/4 |
| 0 | 1 | 0 | 0 | f/5 |
| 0 | 1 | 0 | 1 | f/6 |
| 0 | 1 | 1 | 0 | f/7 |
| 0 | 1 | 1 | 1 | f/8 |
| 1 | 0 | 0 | 0 | f/9 |
| 1 | 0 | 0 | 1 | f/10 |
| 1 | 0 | 1 | 0 | f/11 |
| 1 | 0 | 1 | 1 | f/12 |
| 1 | 1 | 0 | 0 | f/13 |
| 1 | 1 | 0 | 1 | f/14 |
| 1 | 1 | 1 | 0 | f/15 |
| 1 | 1 | 1 | 1 | f/16 |

CLKI FREQUENCY: f

*FIG._15B*

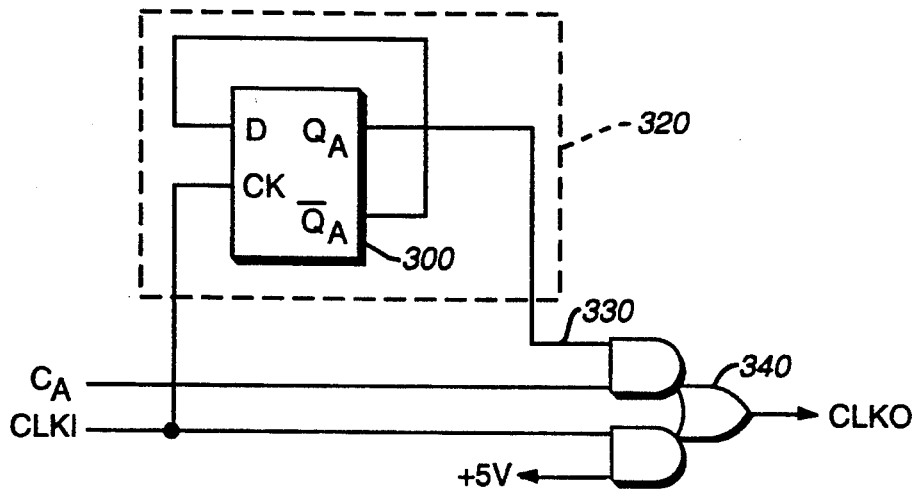
FIG._16A
| $C_A$ | CLKO FREQUENCY |
|---|---|
| 0 | f |
| 1 | f/2 |
CLKI FREQUENCY: f
FIG._16B
| $Q_A$ \ $C_A$ | 0 | 1 |
|---|---|---|
| 0 | 1 | 1 |
| 1 | 0 | 0 |
$\{ Q_A^{(1)} = \overline{Q}_A$
FIG._16D
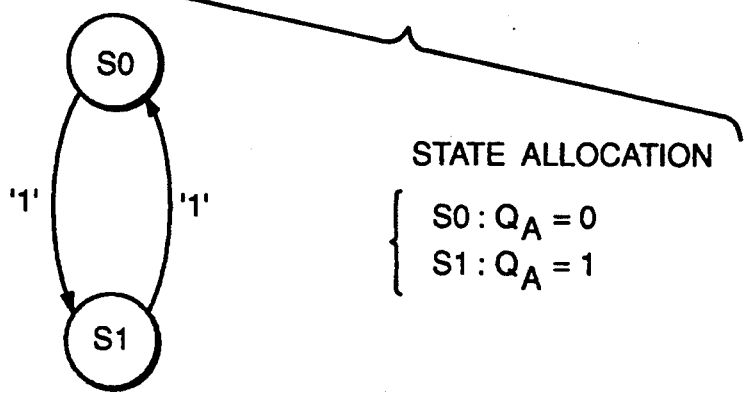
FIG._16C
STATE ALLOCATION
$\{\begin{array}{l} S0 : Q_A = 0 \\ S1 : Q_A = 1 \end{array}$

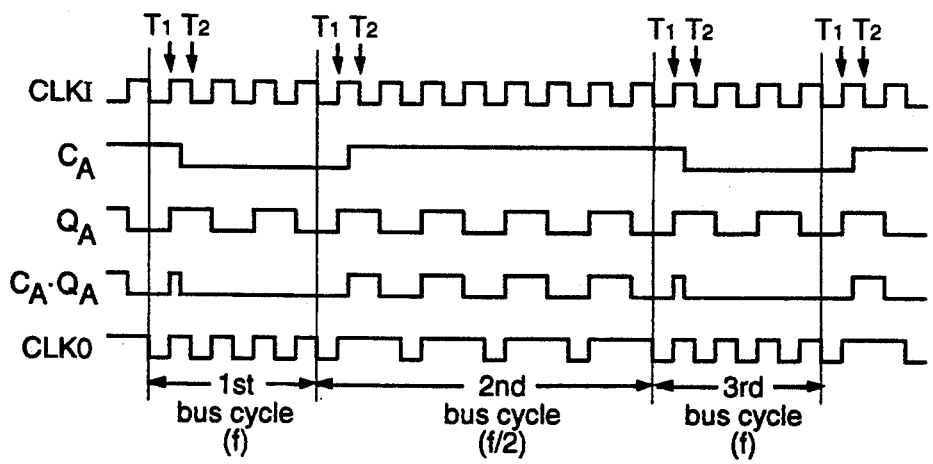
FIG._16E
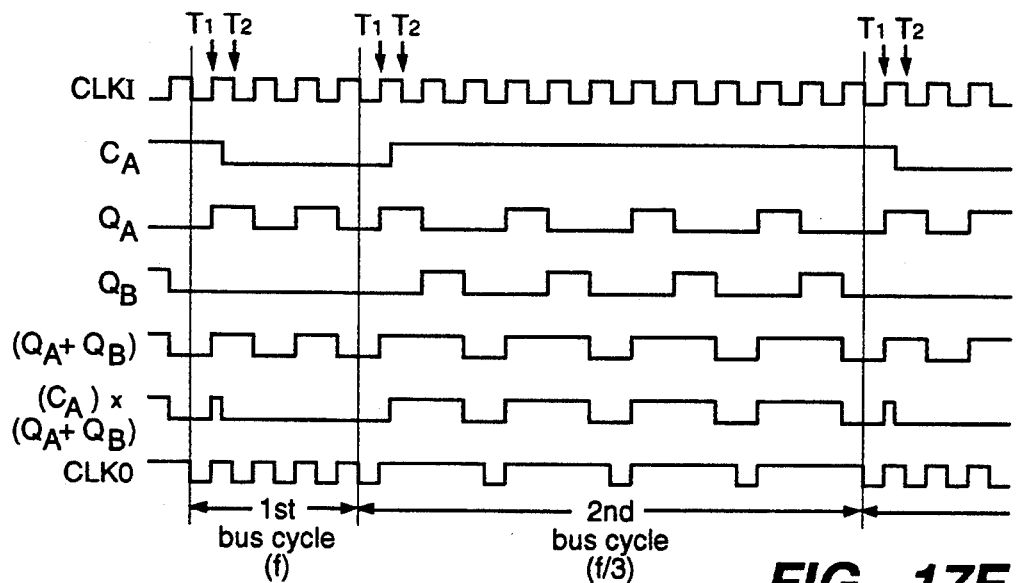
FIG._17E
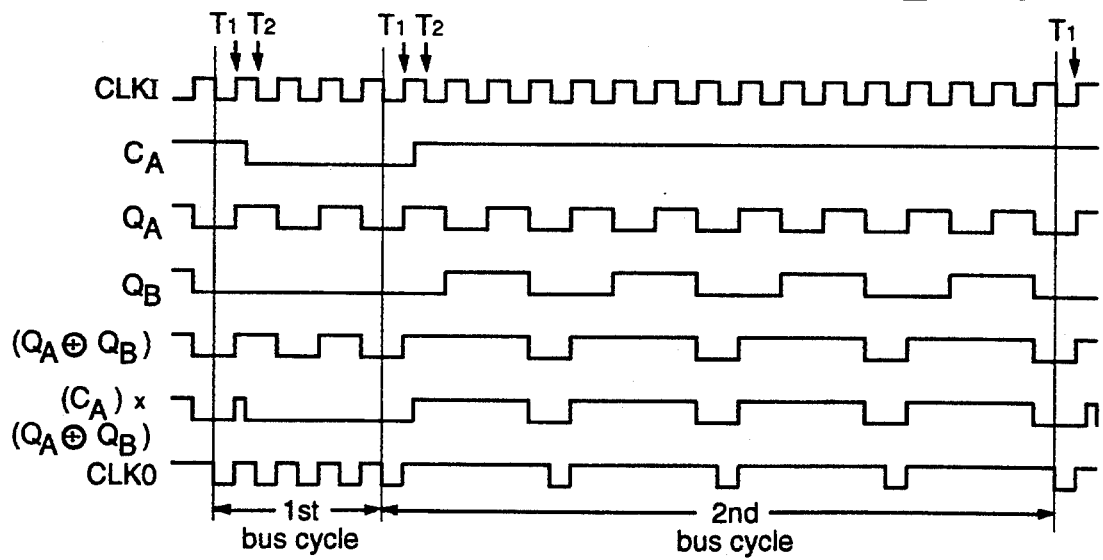
FIG._18E

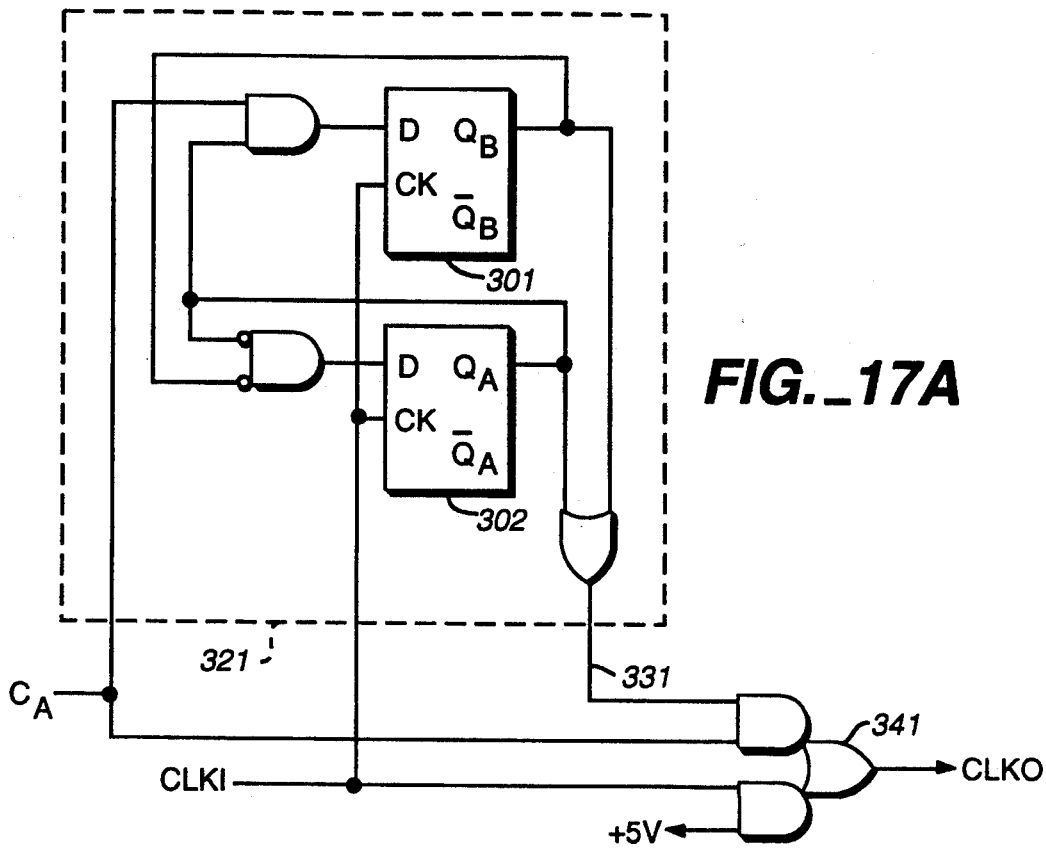
FIG._17A
| $C_A$ | CLKO FREQUENCY |
|---|---|
| 0 | f |
| 1 | f/3 |
CLKI FREQUENCY: f
FIG._17B
| $Q_AQ_B$ \ $C_A$ | 0 | 1 |
|---|---|---|
| 00 | 01 | 01 |
| 01 | 00 | 10 |
| 11 | ** | ** |
| 10 | ** | 00 |
$$\begin{cases} Q_B^{(1)} = C_A \cdot Q_A \\ Q_A^{(1)} = \overline{Q}_B \cdot \overline{Q}_A \end{cases}$$
FIG._17D
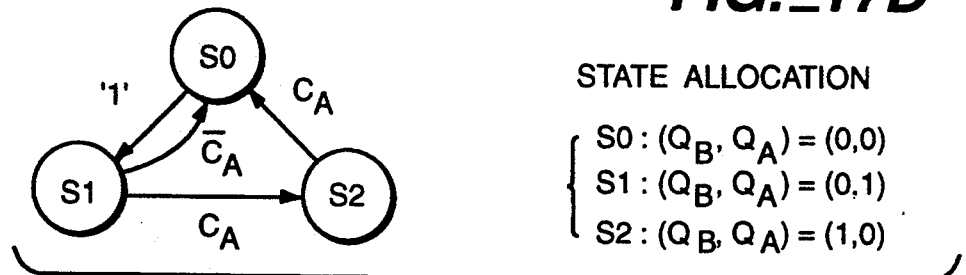
STATE ALLOCATION
$$\begin{cases} S0 : (Q_B, Q_A) = (0,0) \\ S1 : (Q_B, Q_A) = (0,1) \\ S2 : (Q_B, Q_A) = (1,0) \end{cases}$$
FIG._17C

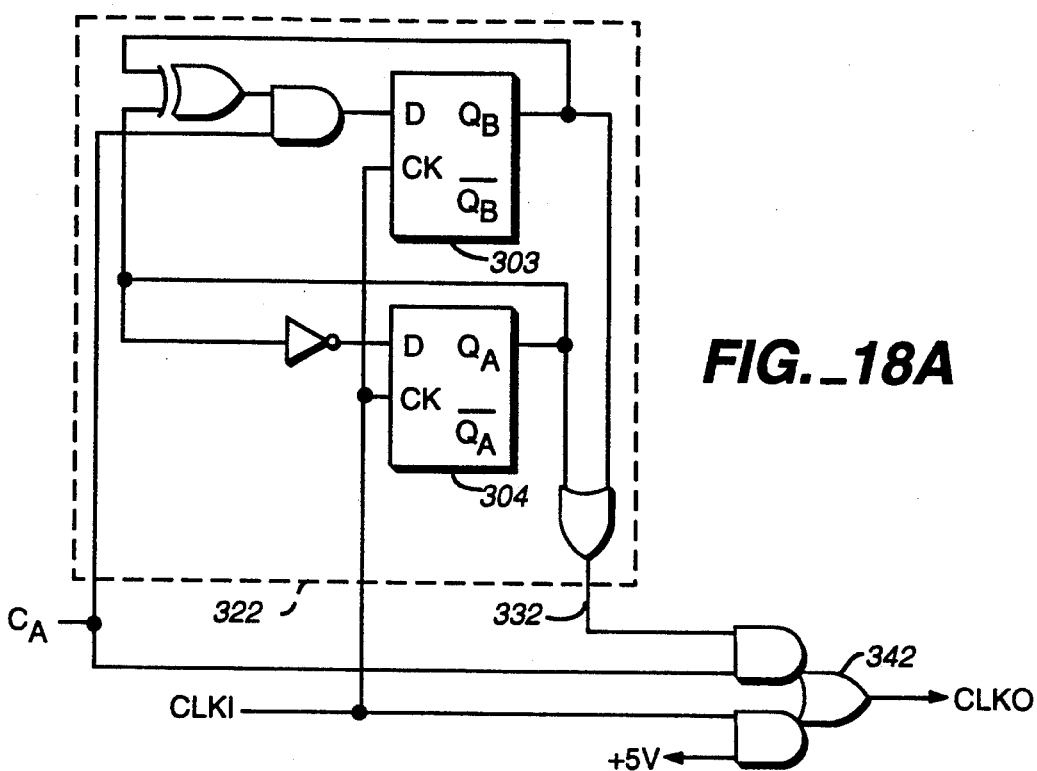
FIG._18A
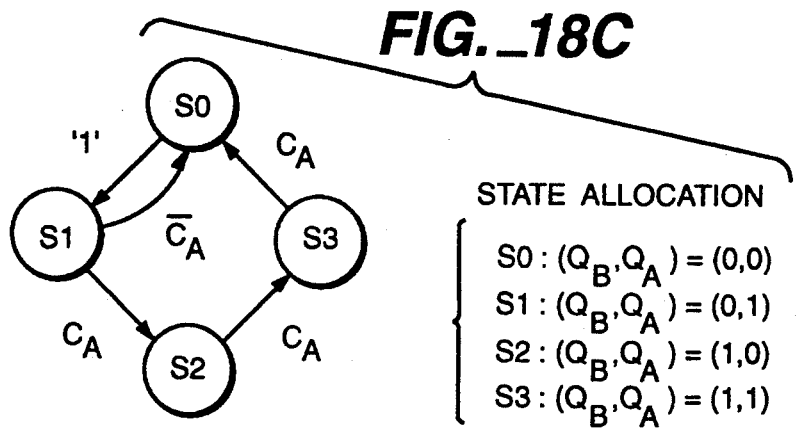
FIG._18B
FIG._18D
$$Q_B^{(1)} = C_A \cdot (Q_B \oplus Q_A)$$
$$Q_A^{(1)} = \overline{Q_A}$$
FIG._18C
STATE ALLOCATION
$S0 : (Q_B, Q_A) = (0,0)$
$S1 : (Q_B, Q_A) = (0,1)$
$S2 : (Q_B, Q_A) = (1,0)$
$S3 : (Q_B, Q_A) = (1,1)$

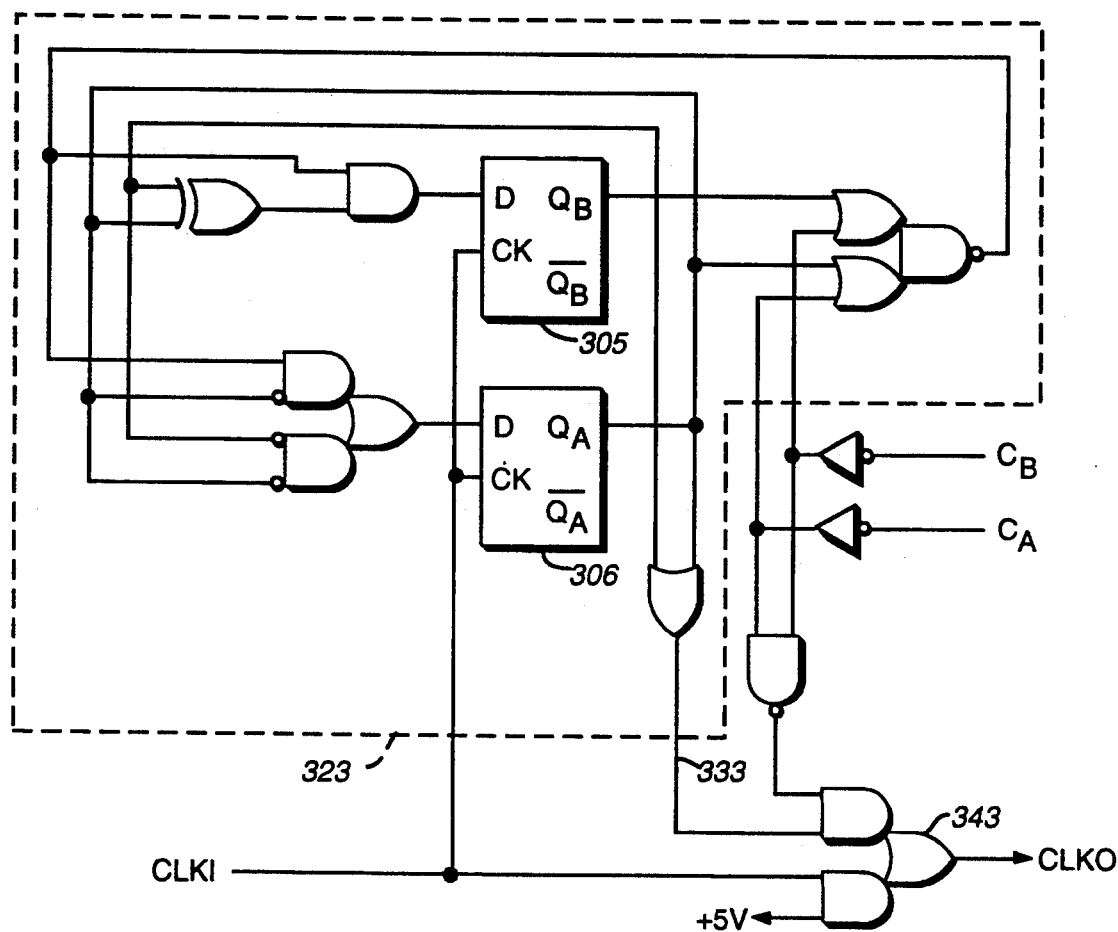
FIG._19A
| $C_B$ | $C_A$ | CLKO FREQUENCY |
|---|---|---|
| 0 | 0 | f |
| 0 | 1 | f/2 |
| 1 | 1 | f/3 |
| 1 | 0 | f/4 |
CLKI FREQUENCY: f
FIG._19B

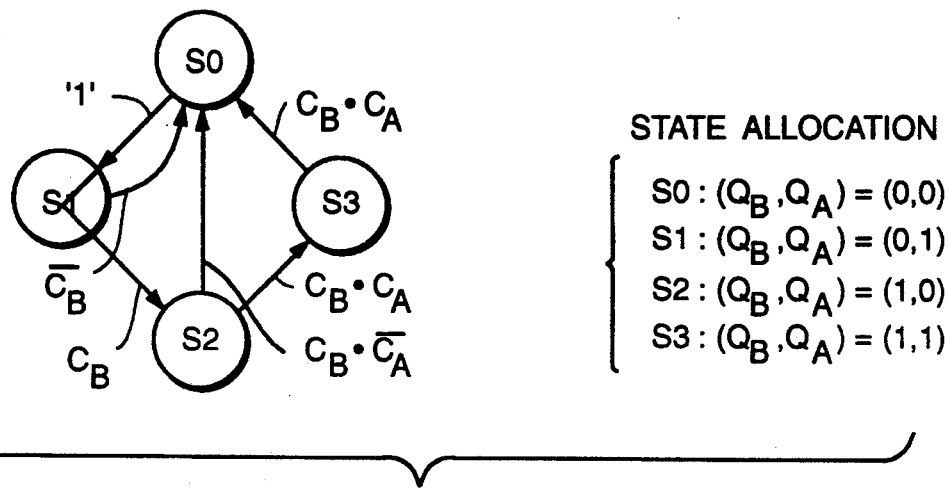
STATE ALLOCATION
$$\begin{cases} S0 : (Q_B, Q_A) = (0,0) \\ S1 : (Q_B, Q_A) = (0,1) \\ S2 : (Q_B, Q_A) = (1,0) \\ S3 : (Q_B, Q_A) = (1,1) \end{cases}$$
FIG._19C
$Q_B(1) \cdot Q_A(1)$ KARNAUGH MAP
| $Q_B Q_A$ \ $C_B C_A$ | 00 | 01 | 11 | 10 |
|---|---|---|---|---|
| 00 | 01 | 01 | 01 | 01 |
| 01 | 00 | 00 | 10 | 10 |
| 11 | ** | ** | 00 | ** |
| 10 | ** | ** | 11 | 00 |
$$\begin{cases} Q_B^{(1)} = (Q_B \oplus Q_A) \cdot (C_B \cdot \overline{Q}_B + C_A \cdot \overline{Q}_A) \\ Q_A^{(1)} = \overline{Q}_B \cdot \overline{Q}_A + \overline{Q}_A \cdot (C_B \cdot \overline{Q}_B + C_A \cdot \overline{Q}_A) \end{cases}$$
FIG._19D

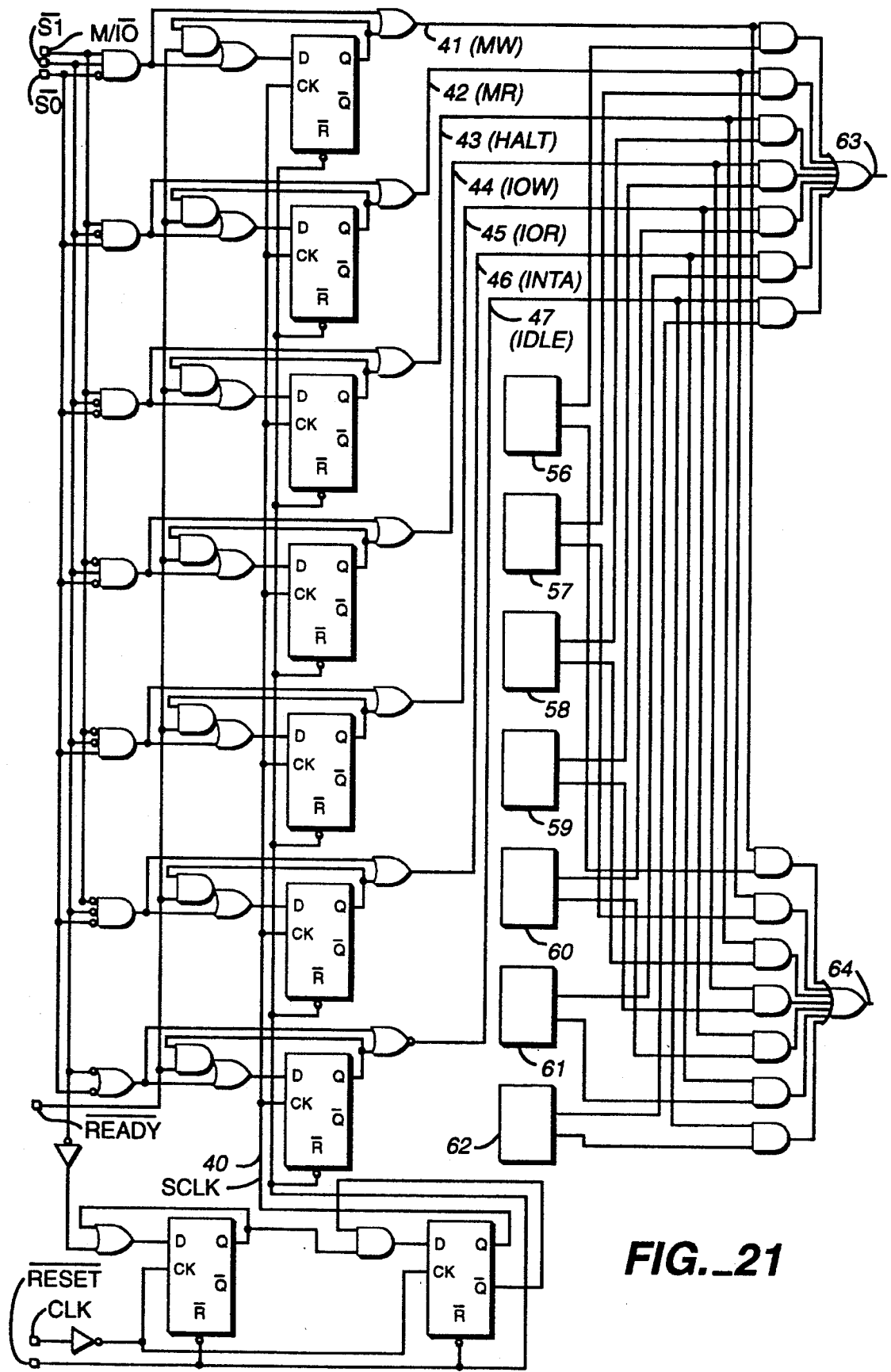
FIG._21

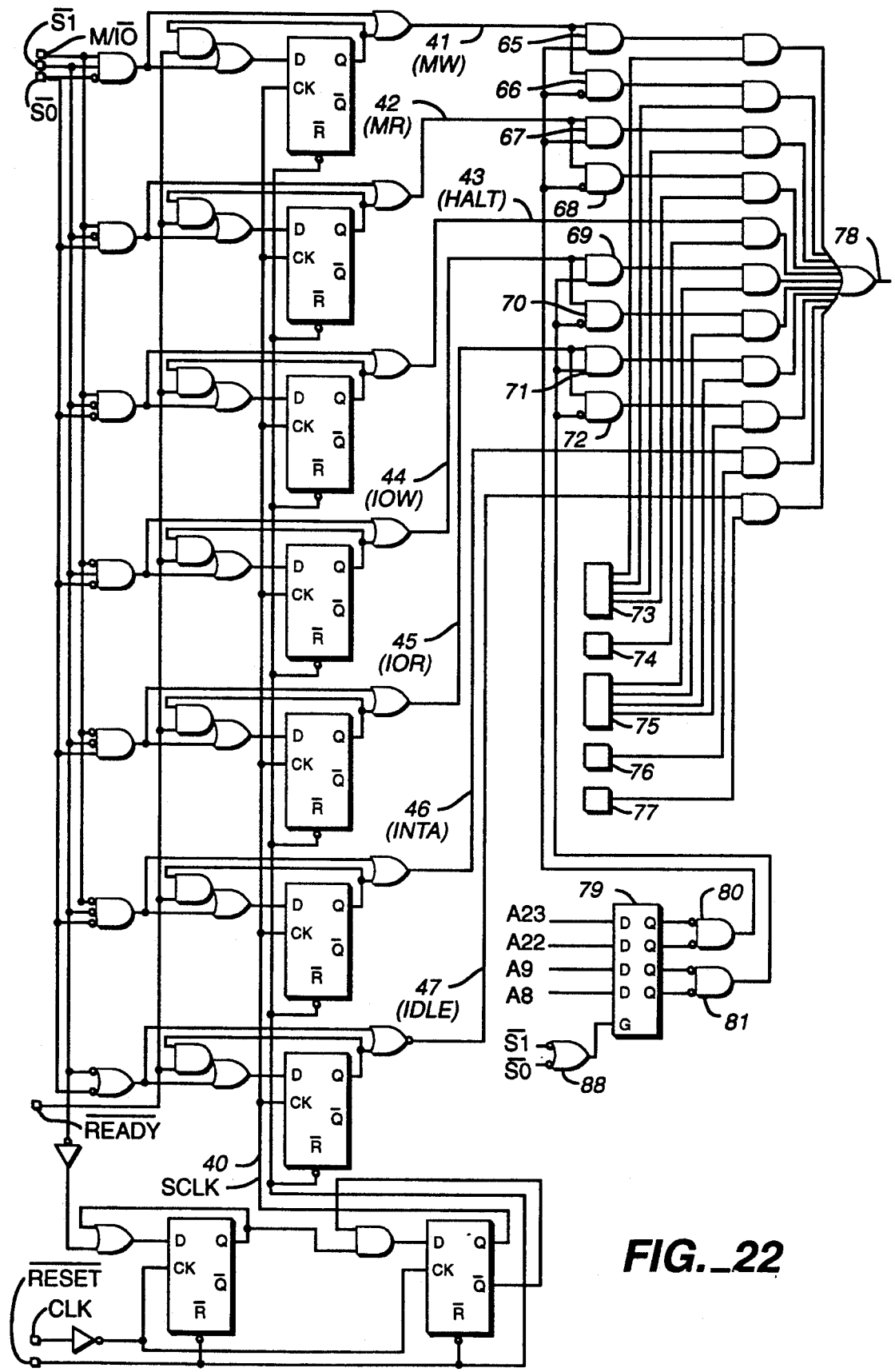
FIG._22

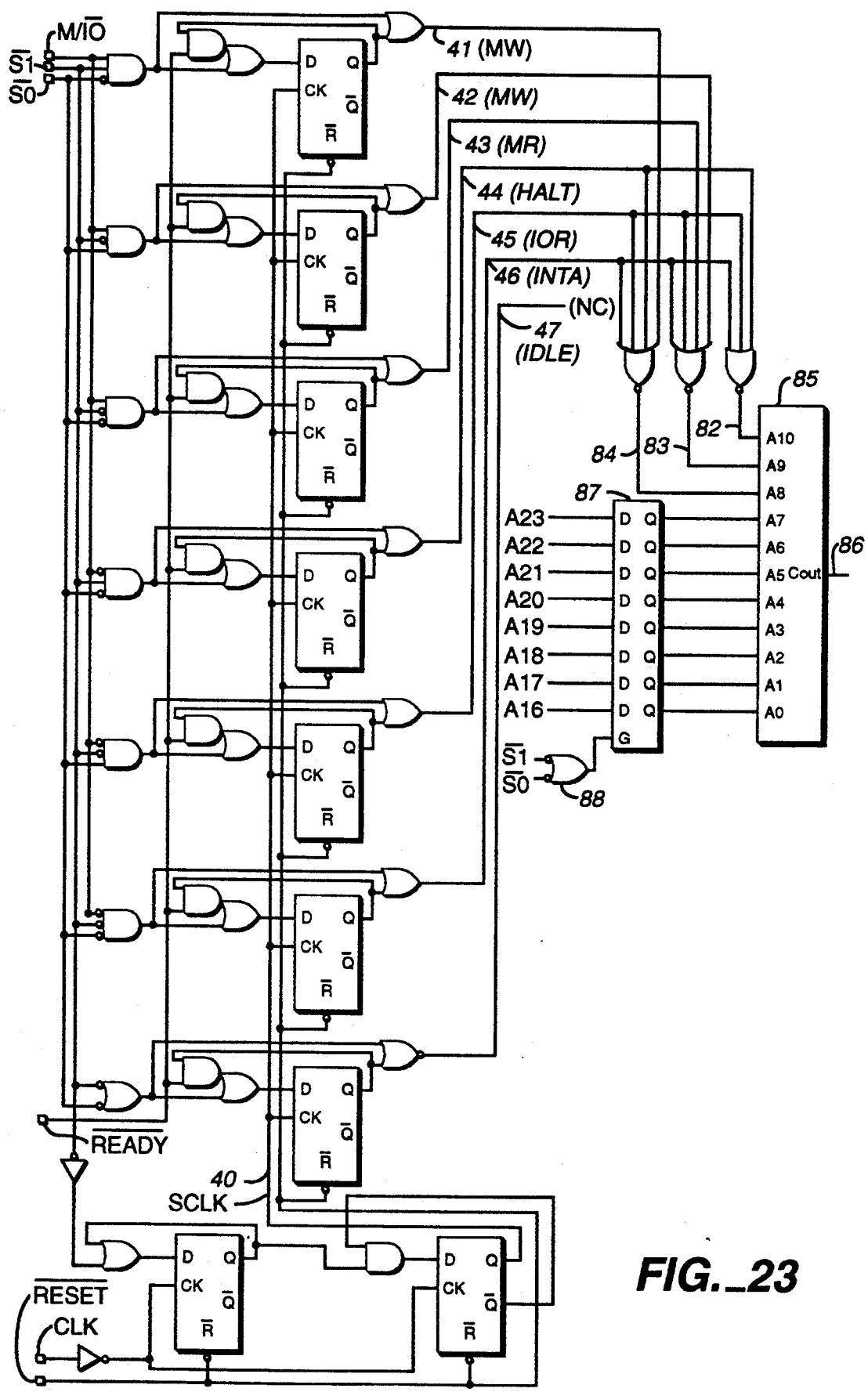
FIG._23

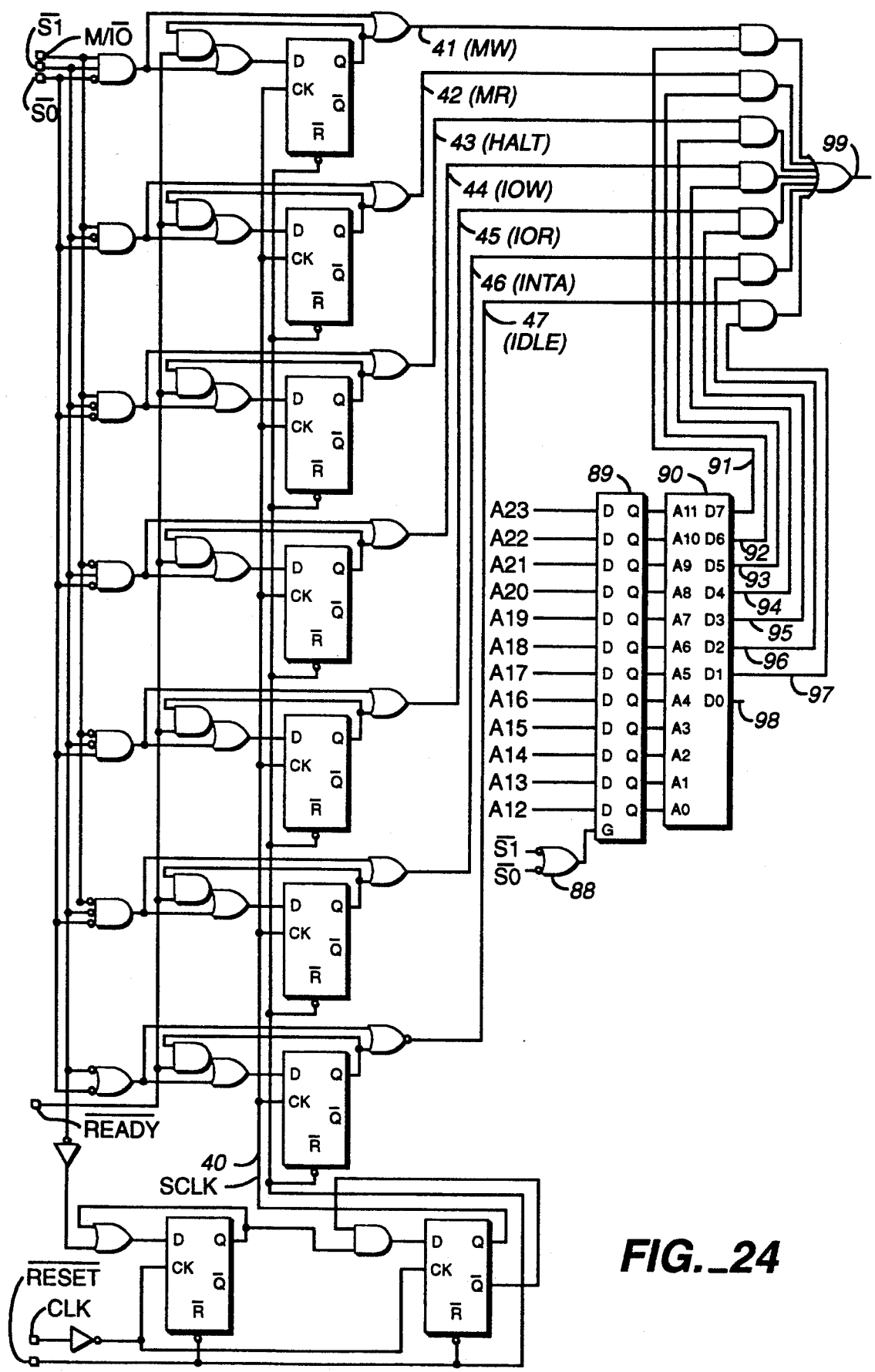
FIG._24

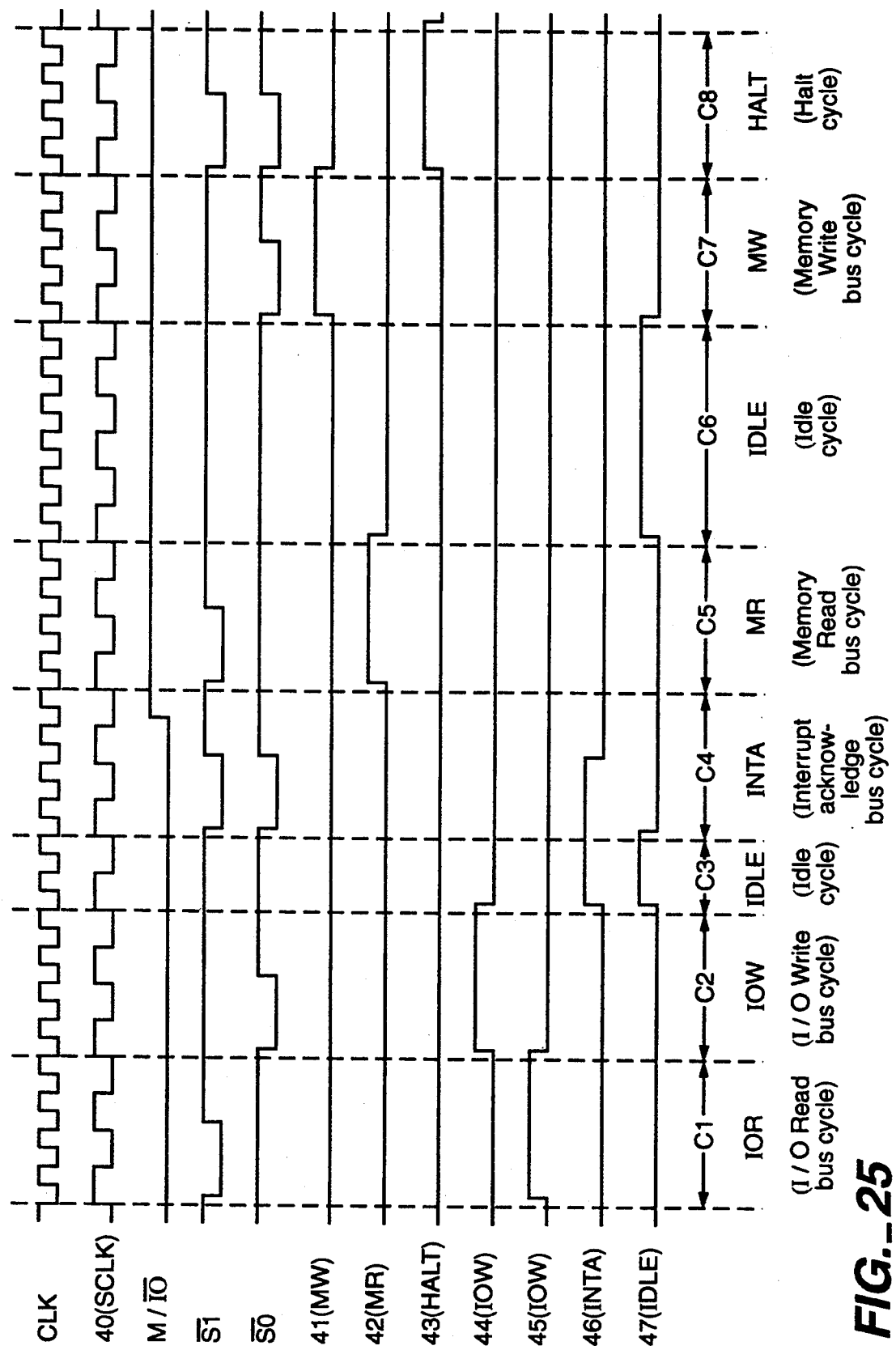
FIG._25

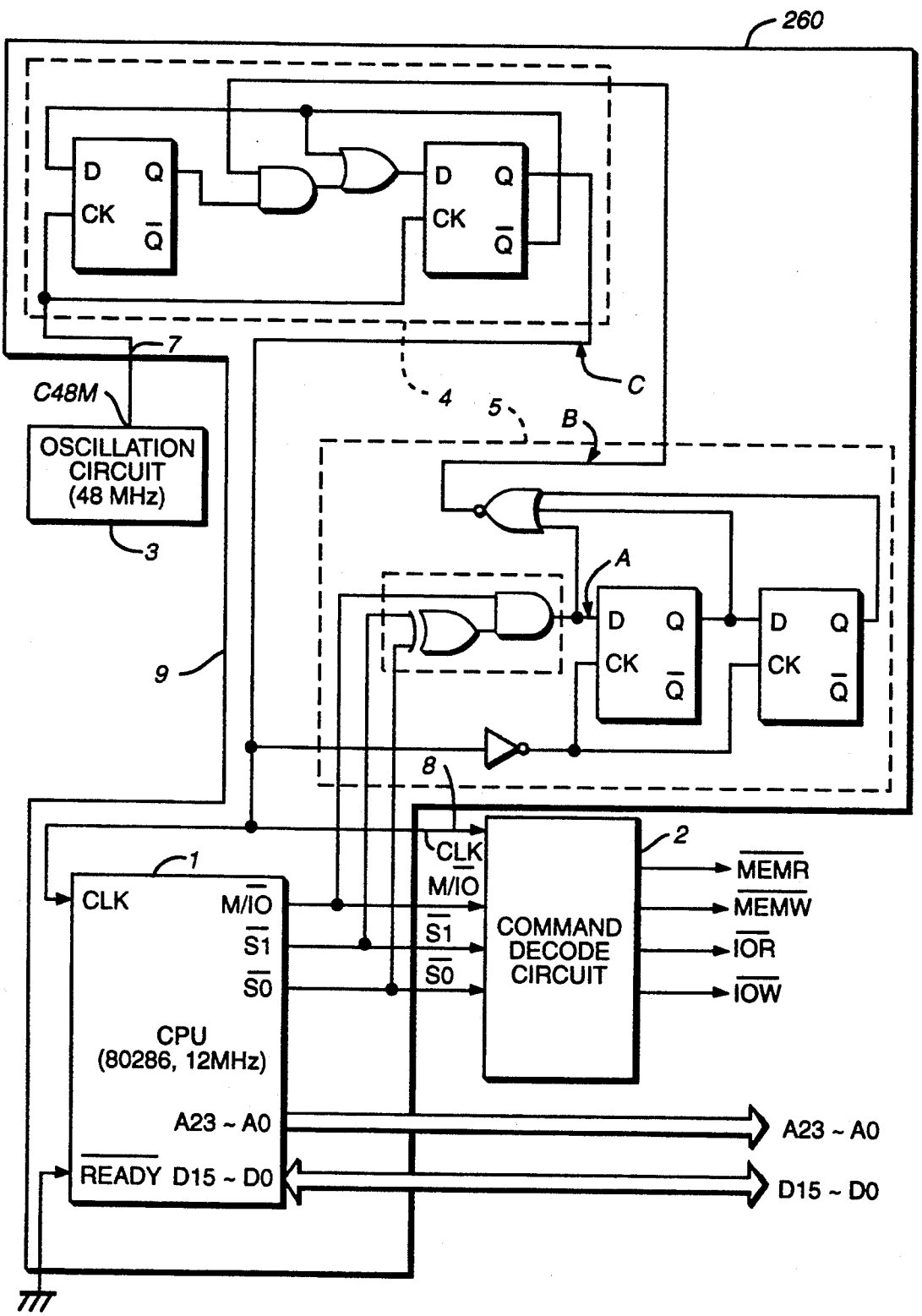
FIG._ 26

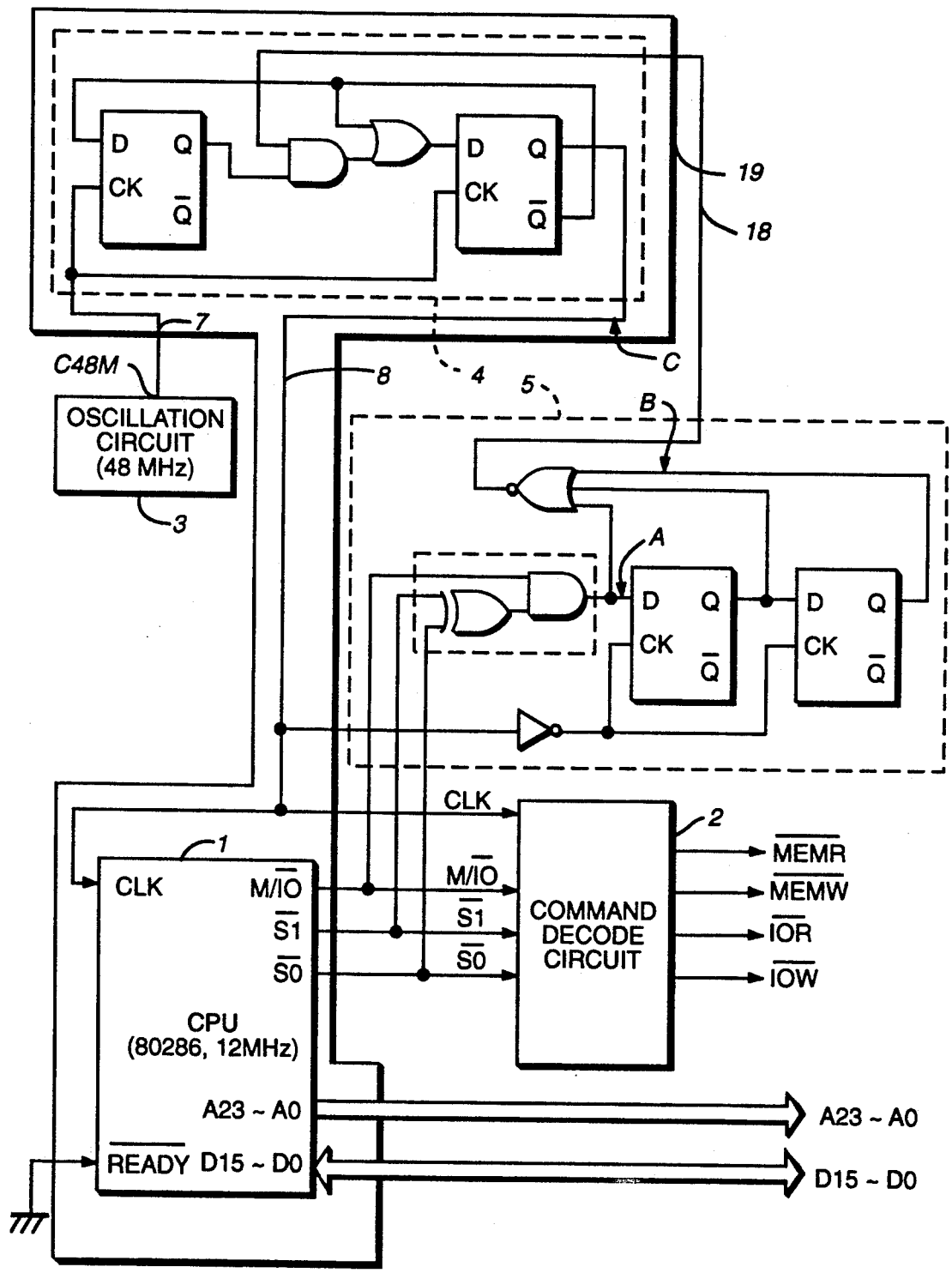
FIG._27

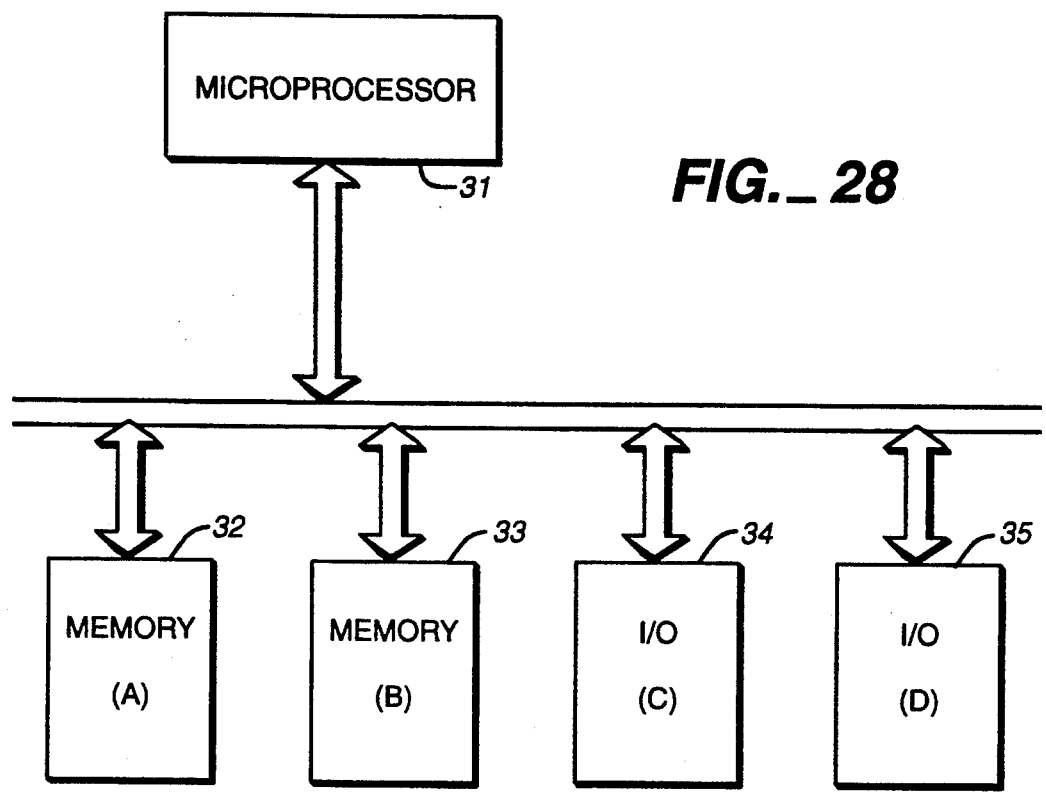
FIG._28
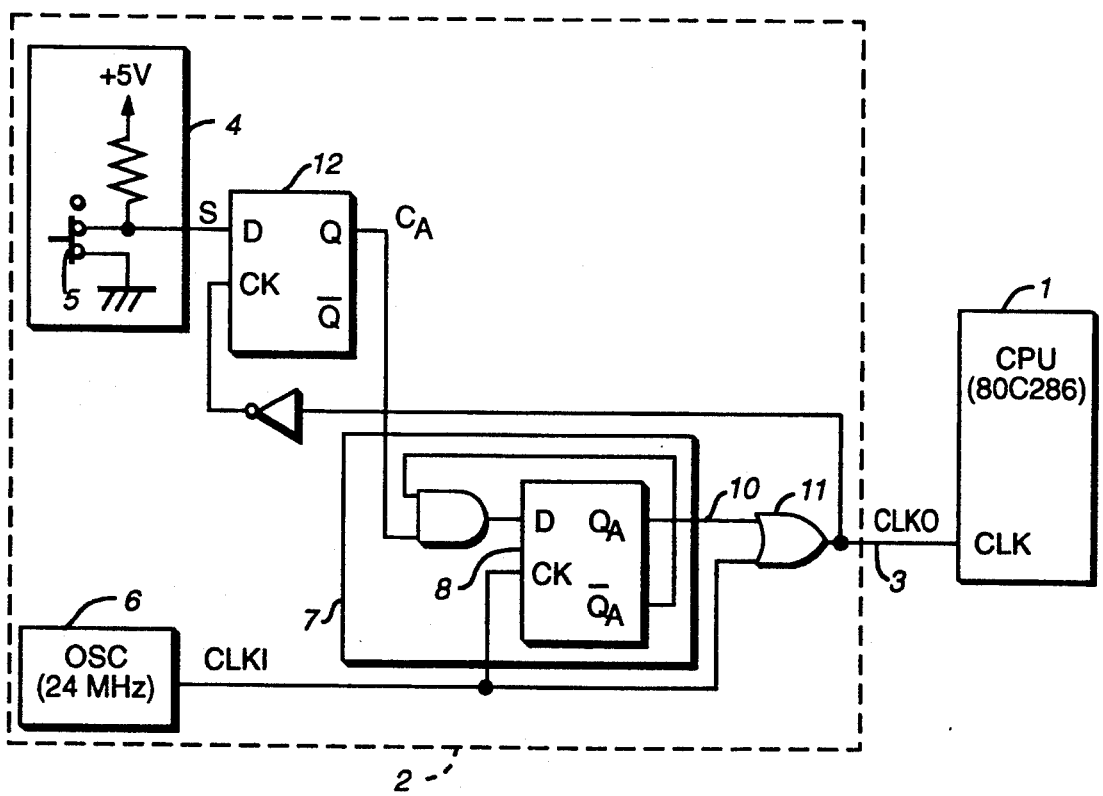
FIG._29A

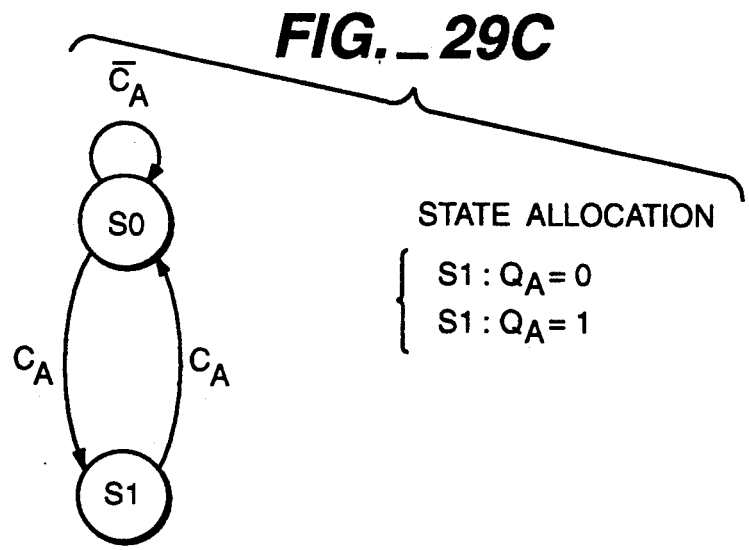
FIG._29B
FIG._29D
FIG._29C
STATE ALLOCATION
$\begin{cases} S1 : Q_A = 0 \\ S1 : Q_A = 1 \end{cases}$
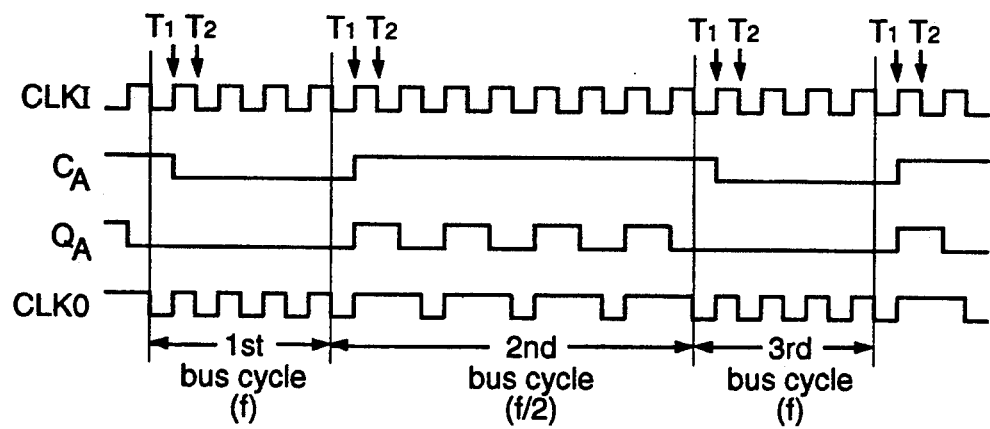
FIG._29E

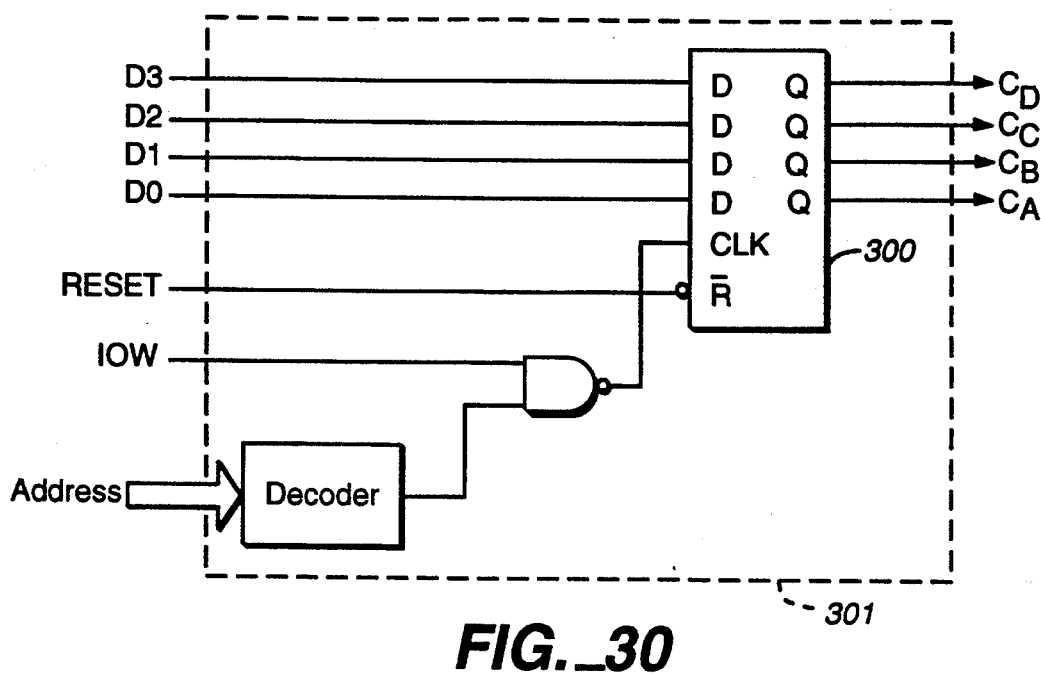
FIG._30
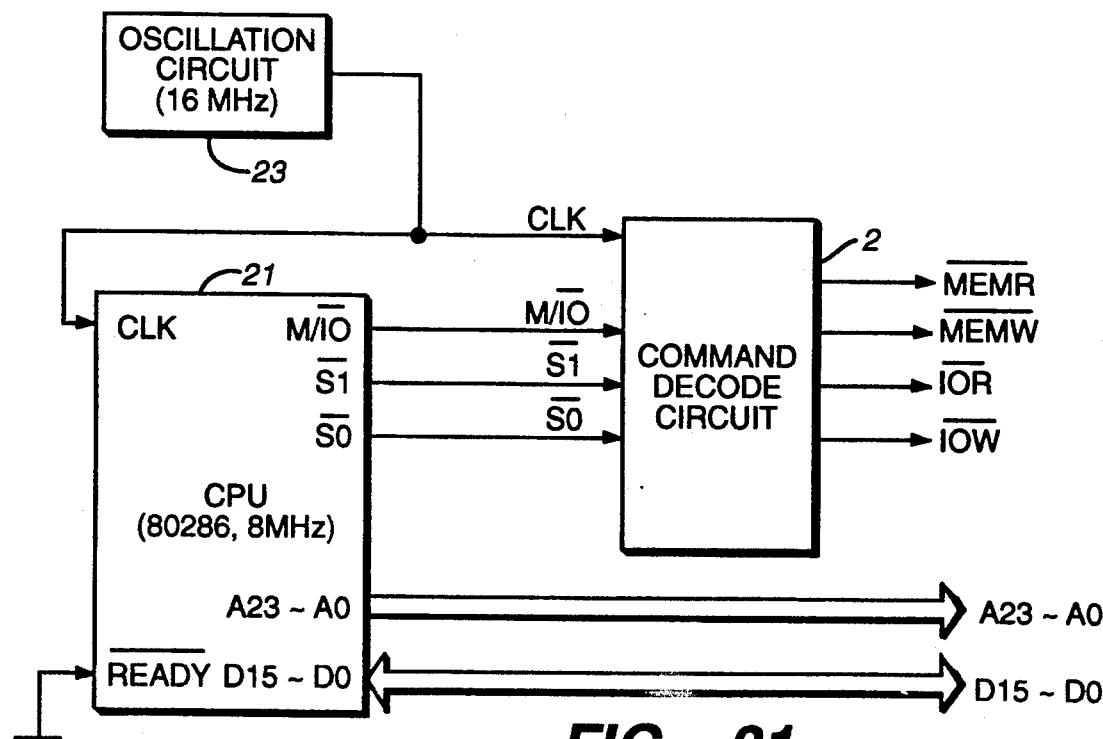
FIG._31
(PRIOR ART)

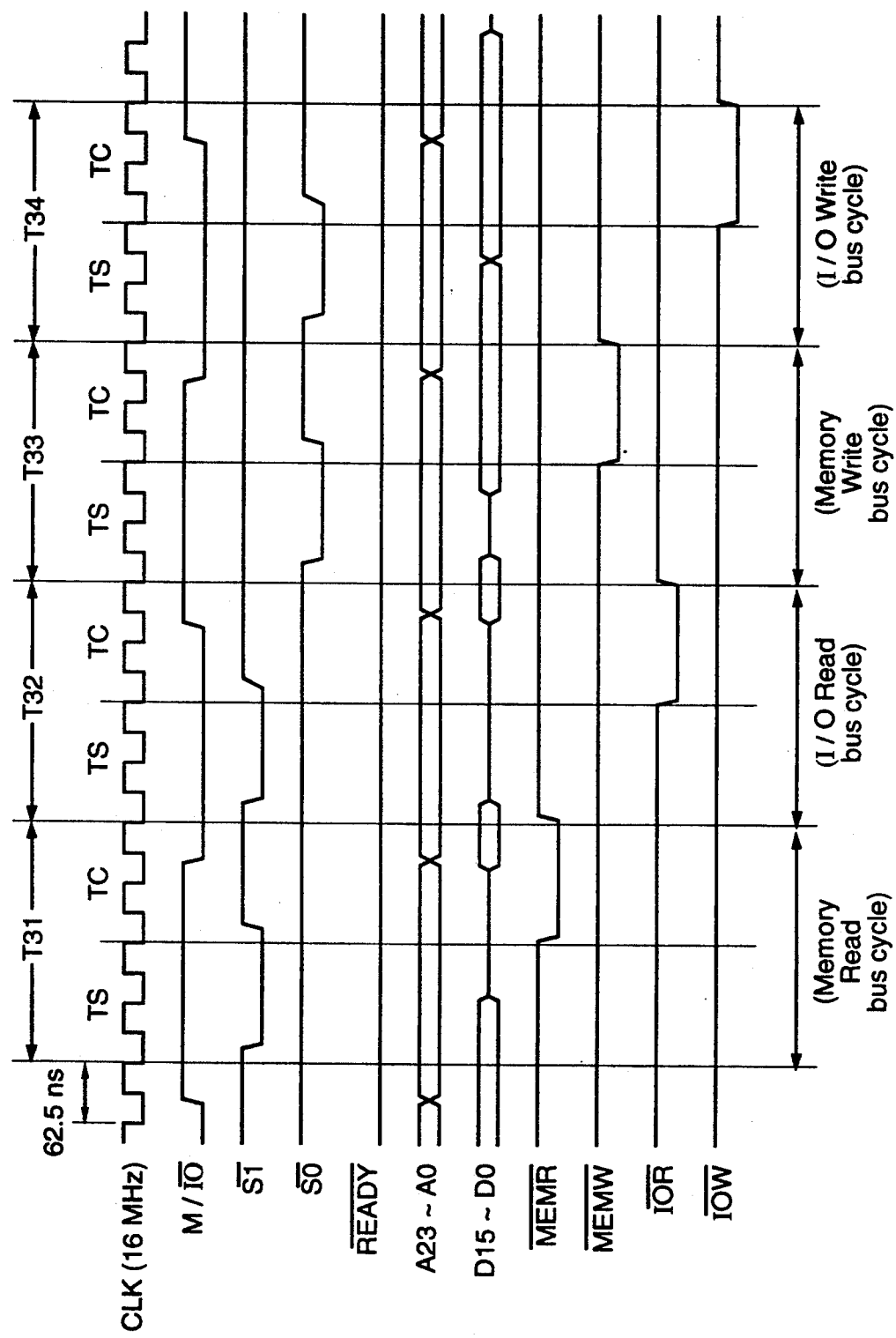
FIG._32

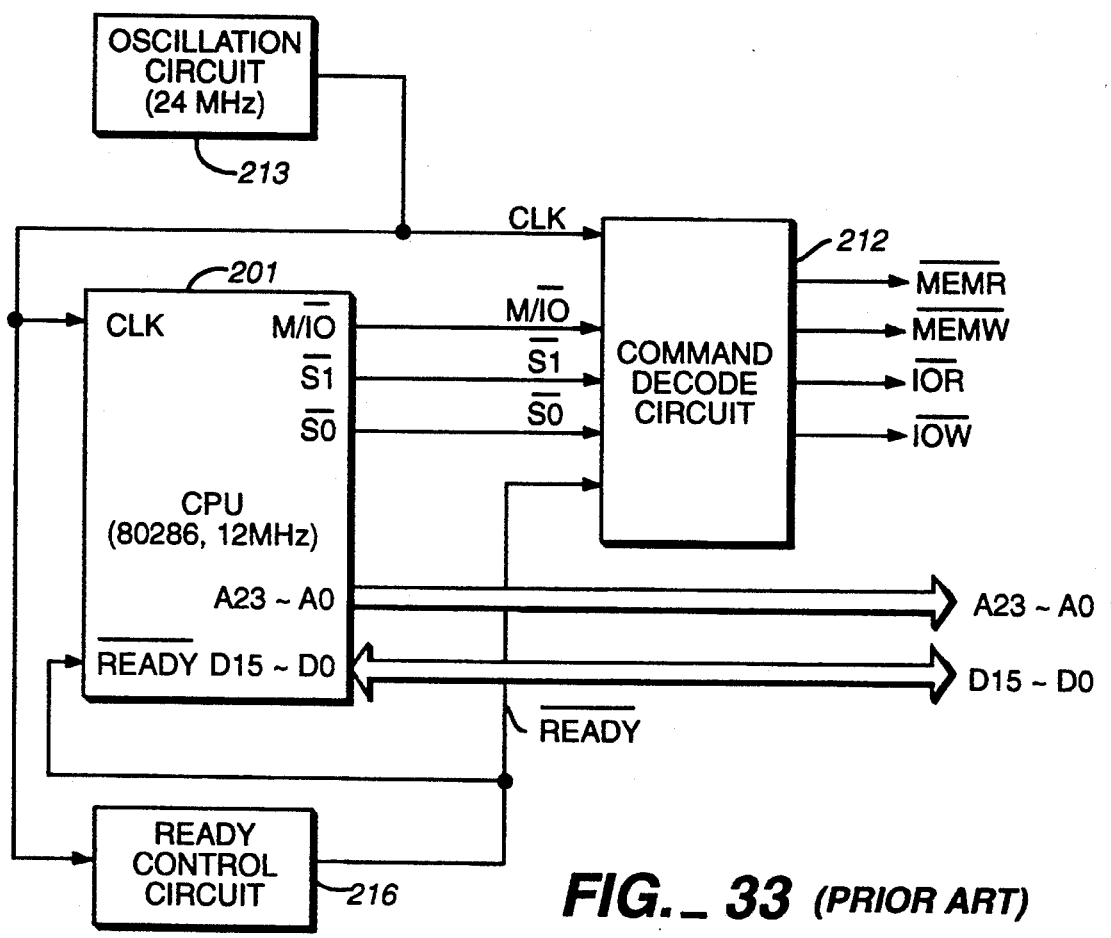
FIG._ 33 (PRIOR ART)

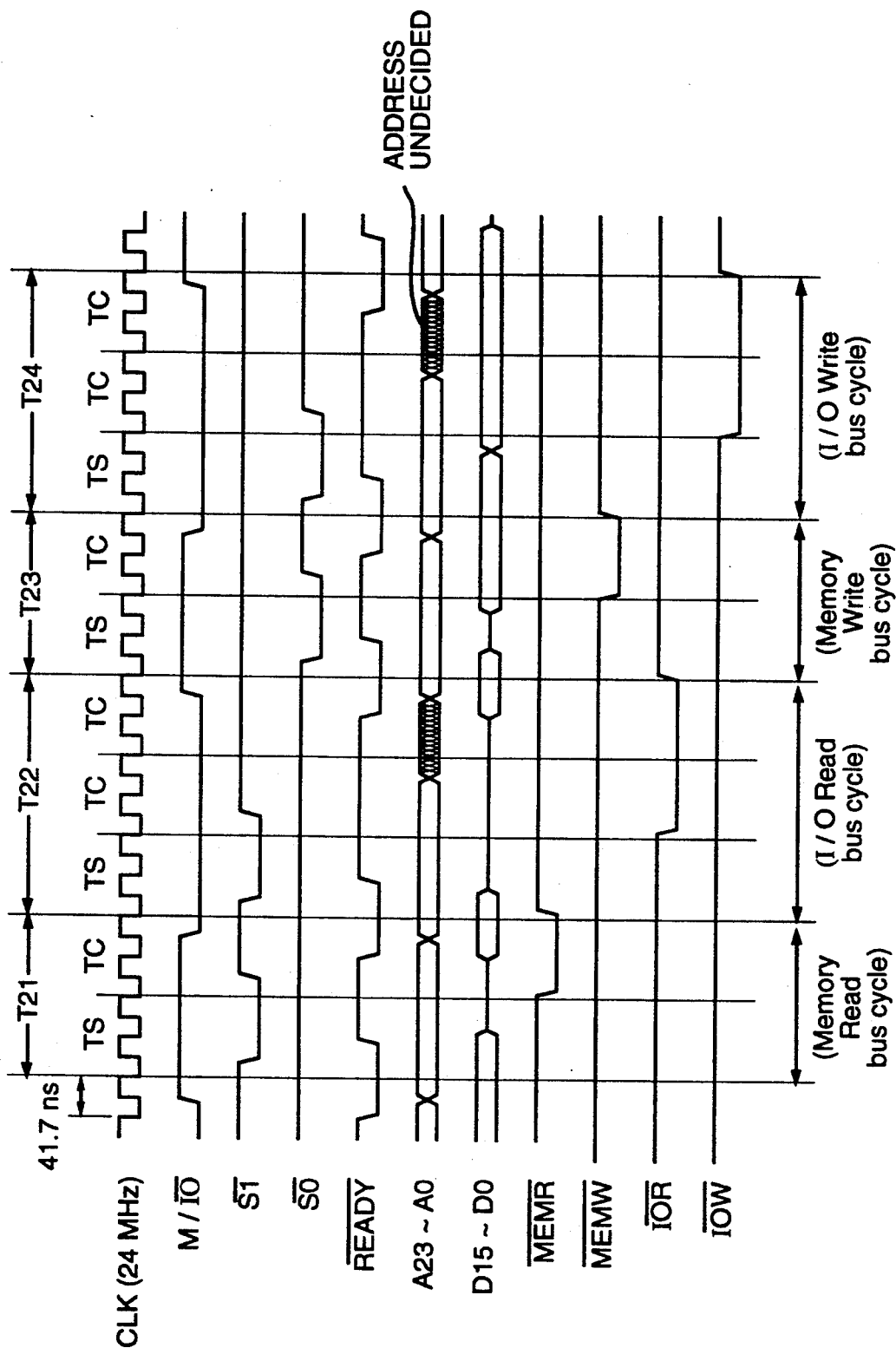
FIG._34 (PRIOR ART)

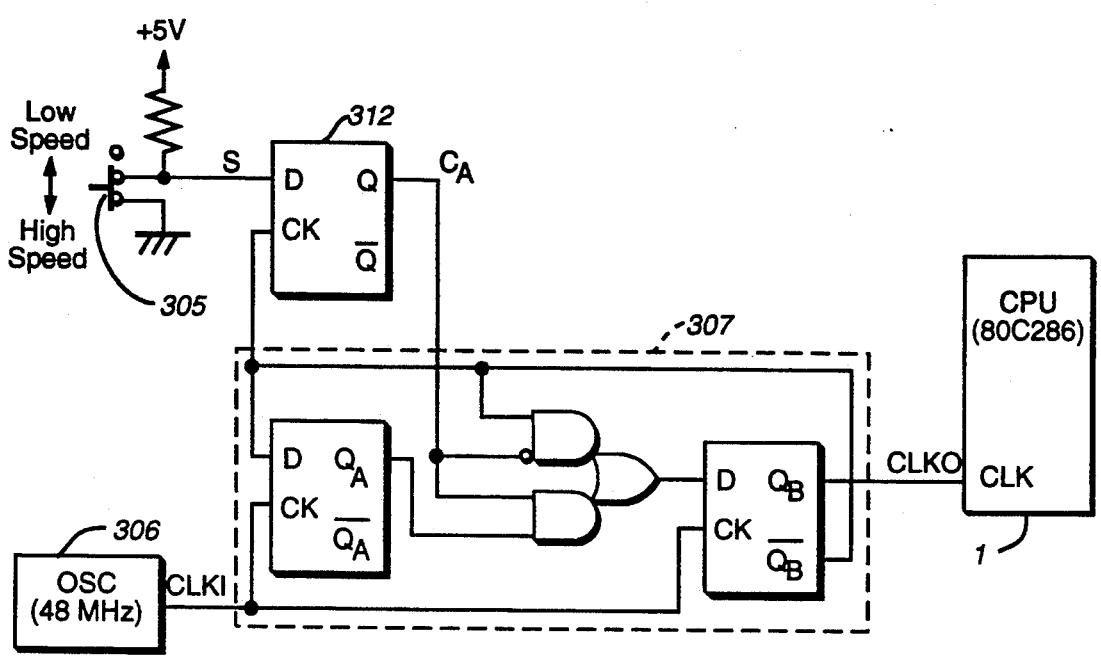
FIG._35A (PRIOR ART)
| $C_A$ | CLKO FREQUENCY |
|---|---|
| 0 | 24 MHz |
| 1 | 12 MHz |
CLKI FREQUENCY: 48 MHz
FIG._35B (PRIOR ART)
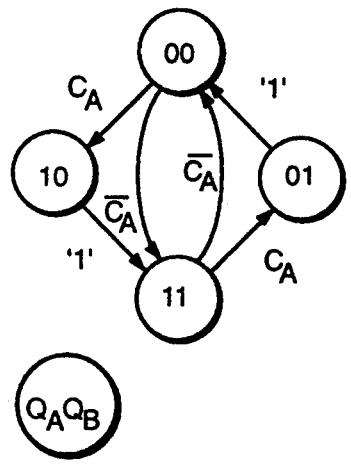
'1': UNCONDITIONAL BRANCHING
FIG._35C (PRIOR ART)

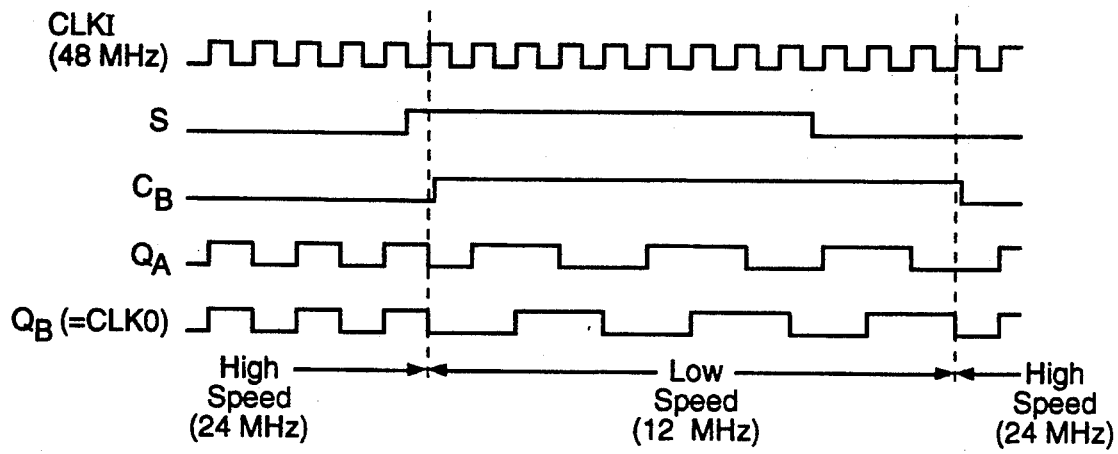
FIG._35D
(PRIOR ART)
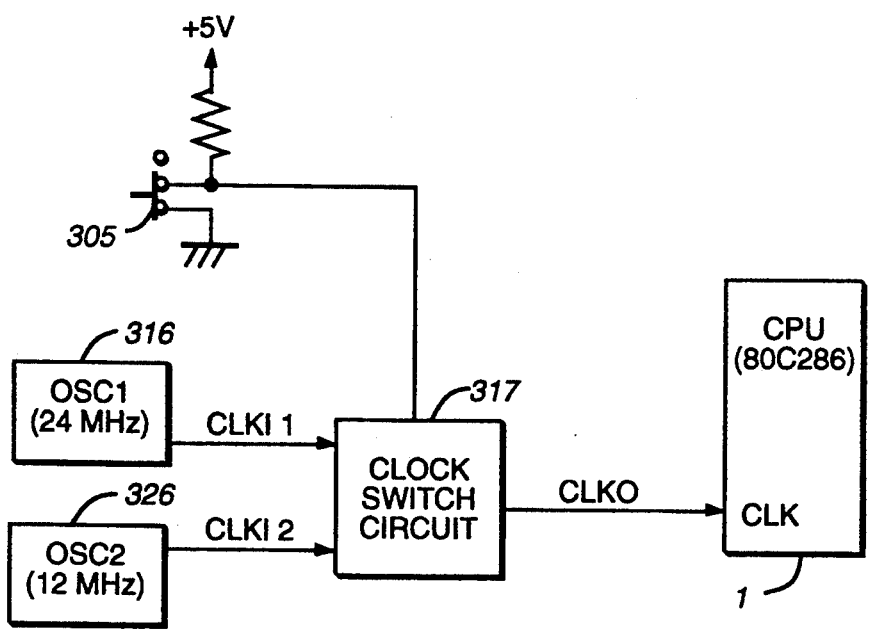
FIG._36
(PRIOR ART)

CPU CLOCK GENERATOR HAVING A LOW FREQUENCY OUTPUT DURING I/O OPERATIONS AND A HIGH FREQUENCY OUTPUT DURING MEMORY OPERATIONS

This is a continuation of copending application Ser. No. 07/522,211 filed May 10, 1990.

BACKGROUND OF THE INVENTION

1. Field of the Invention

This invention relates generally to an information processing device for use in personal computers, workstations, etc., and more particularly to a system for controlling the frequency operation or execution time of a bus cycle to be executed by the central processing unit (CPU) of an information processing device.

2. Description of Related Art

The recent progress in the techniques for increasing the operational rate of CPUs, dynamic random access memories (DRAMs), and erasable programmable read only memories (EPROM) has been phenomenal. Accompanying this progress, makers of personal computers have annually developed and marketed new products with improved processing rates. The clock frequency of the CPU is substantially increased and DRAMs, EPROMs or such memory units are employed as high speed memory for improving performance. However, although the CPU and memory speed have been significantly improved, the operational speed of Input/Output (I/O) devices and units employed in conjunction with such CPUs have not been correspondingly increased. Accordingly, when the clock frequency of the CPU is increased, the operational speed of associated CPU memory is as high as that of the CPU. However, the associated I/O device cannot operate at the processing speed of the CPU. As a result, some means is necessary for solving this problem.

Conventionally, this problem has been dealt with by employing the READY terminal of the CPU to cause the CPU to wait for the slower execution action of the I/O device, i.e. when the CPU accesses the I/O device, the I/O device inactivates the READY signal in order to cause the CPU to wait while the I/O devices completes the execution of instructions. As a result, the high speed CPU and the low speed I/O device are operationally congruent with one another.

The foregoing conventional method is now explained by means of the following examples. FIGS. 35 and 36 are explanatory views of a referenced information processing device. This referenced information processing device has been set up for the purpose of clarifying the differences between the invention of this application and the conventional art. The parts of the information processing device which are not directly relevant to this invention have been much simplified or omitted since they are not necessary to the explanation of this invention. Accordingly, the referenced information processing device is a little unnatural compared with the conventional information processing device but is illustrated as such because of the convenience and clarity it brings in understanding the invention of this application. The conventional method of increasing the processing or operational speed of the referenced information processing device is illustrated in FIGS. 35 and 36.

FIG. 31 illustrates a referenced information processing device. FIG. 32 is a timing diagram illustrating the operation of the information processing device of FIG. 31. In FIG. 31, CPU 21 is an 8 MHz version of the INTEL 80286. Relative to the terminals of CPU 21, CLK represents a clock input terminal and is supplied with a frequency twice an operational speed of CPU 21. Three signals, M/$\overline{\text{IO}}$, $\overline{\text{S1}}$, $\overline{\text{S0}}$ are state discrimination signals representing the state of a bus cycle of CPU 21. These signals indicate the states set forth in Table 1 below. In Table 1, the corresponding signals are only those relevant to the description of this application.

TABLE 1

| M/$\overline{\text{IO}}$ | $\overline{\text{S1}}$ | $\overline{\text{S0}}$ | Bus Cycle | Corresponding Signals |
|---|---|---|---|---|
| 0 | 0 | 0 | Interrupt Acknowledge | |
| 0 | 0 | 1 | I/O Read | $\overline{\text{IOR}}$ |
| 0 | 1 | 0 | I/O Write | $\overline{\text{IOW}}$ |
| 0 | 1 | 1 | None (Idle) Hold or Shutdown | |
| 1 | 0 | 1 | Memory Read | $\overline{\text{MEMR}}$ |
| 1 | 0 | 1 | Memory Read | $\overline{\text{MEMW}}$ |
| 1 | 1 | 1 | None (Idle) | |

Table 1 illustrates the correspondence between the bus cycles respectively with M/$\overline{\text{IO}}$, $\overline{\text{S1}}$, and $\overline{\text{S0}}$. READY represents a ready terminal. When the signal at the ready terminal is high, extended bus cycles are activated into operation and when the signal is low, the bus cycles are terminated. In FIG. 31, for simplifying the explanation, READY is set low. A23-A0 are address buses. D15-D0 are data buses. A command decode circuit 2 produces command signals $\overline{\text{MEMR}}$, $\overline{\text{MEMW}}$, $\overline{\text{IOR}}$, $\overline{\text{IOW}}$) corresponding to the state discrimination signals M/$\overline{\text{IO}}$, $\overline{\text{S1}}$, $\overline{\text{S0}}$ indicative of the states of the bus cycles. The output of an oscillation circuit 23 is 16 MHz which is the clock signal for CPU 21.

FIG. 32 illustrates the timing relationships among the respective signals in the circuit of FIG. 31 and the timing diagram of four bus cycles executed by CPU 21. T31 represents the memory read bus cycle; T32, the I/O read bus cycle; T33, the memory write bus cycle; and T34, the I/O write bus cycle. Each of the bus cycles comprises two clock cycles TS and TC. Each of the clock cycles comprises two CLK pulses. Each of the CLK pulses has a frequency of 16 MHz, and the period of each cycle TS, TC is 125 ns (f/sec.). The period of each of the four bus cycles T31, T32, T33 and T34 is 250 ns. CPU 21 outputs the state discrimination signals M/$\overline{\text{IO}}$, $\overline{\text{S1}}$, and $\overline{\text{S0}}$ to discriminate relative to the respective bus cycles. Command decode circuit 2 decodes these state discrimination signals into corresponding command signals, i.e., $\overline{\text{MEMR}}$ relative to the bus cycle T31, $\overline{\text{IOR}}$ relative to the bus cycle T32, $\overline{\text{MEMW}}$ relative to the bus cycle T33, and IOW relative to the bus cycle T34. Each signal $\overline{\text{MEMR}}$, $\overline{\text{IOR}}$, $\overline{\text{MEMW}}$ and $\overline{\text{IOW}}$ has a pulse width of 125 ns.

FIG. 33 is a block diagram of the conventional method employed in connection with a referenced information device for providing an increase in the processing speed of a referenced information device shown in FIG. 31. In FIG. 33 CPU 201 is a 12 MHz version product of the INTEL 80826. Oscillation circuit 213 has an output pulse of a higher frequency comprising 24 MHz. When the clock frequency of CPU 201 is increased from 16 MHz to 24 MHz relative to the circuit of FIG. 31, the periods of the respective bus cycles (T31-T34) in FIG. 32 change from 250 ns to 167 ns, i.e., the cycle periods are shortened by approximately 33%. The memory read bus cycle and the memory write bus cycle can be executed in a period of 167 ns without any difficulty by employing a high speed memory. It is difficult, however, to operate an I/O device in 167 ns period because the processing speed of the I/O device has not been improved like that of memory units and substantially the same I/O bus cycle period as found in the referenced information processing device of FIGS. 31 and 32 is required. As a result, it is necessary to use the $\overline{READY}$ signal to provide an extended wait period for the execution of the I/O read bus cycle and I/O write bus cycle. READY control circuit 216 provides this extended wait function for the I/O bus cycle. No wait is necessary for the memory bus cycles. Command decoder circuit 212 in FIG. 33 also has the function of extending the pulse of the $\overline{IOR}$ and the $\overline{IOW}$ signals during a wait period in addition to the function of the command decoder previously described in connection with FIG. 31.

FIG. 34 is a flow diagram of the timing relationships among the respective signals in the circuit of FIG. 33. As in FIG. 32, the timing diagram of four bus cycles are shown. Each CLK pulse has a frequency of 24 MHz, and the period of each of clock cycles TS and TC is 83 ns. The period of each memory read bus cycle T21 and memory write cycle T23, which are provided with no wait, is 167 ns. In contrast to this, each I/O bus read bus cycle T22 and I/O write bus cycle T24, which are provided one wait in accordance with a wait signal, comprises three clock cycles TS, TC and TC, i.e., the periods of these bus cycles are 250 ns and are the same as those of bus cycles T32 and T34. An IOR signal and an IOW signal in bus cycles T22 and T24 are the most active among the inserted clock cycles TC and have a pulse width of 167 ns.

In the referenced information processing device of FIGS. 33 and 34, the $\overline{READY}$ signal is causes CPU 201 to wait in order to extend the bus cycles to thereby adjust the operational speed of a slower I/O device. Conventionally this method has caused substantially no problems. However, recently there have occurred situations indicating that this method is not perfect and is undesirable. Recently, personal computers have been progressively standardized. The specifications of especially the so called option slots, the connectors for expansion boards, have been fairly standardized. The option slots are connectors provided in personal computers for receiving expansion boards optionally used by users when they need functions in addition to those basically provided by personal computers manufactures. The expansion boards are supplied in a wide variety of types and kinds by personal computer manufacturers themselves and also by special expansion board third party vendors. Thus, expansion boards for the personal computers are becoming more and more important. Accordingly when personal computer manufactures merchandise new products, they are forced to design them beforehand so that a number of expansion boards produced for already marketed products can also operate on these new products.

The following assumptions are made relative to the circuits of FIGS. 31 and 33. The circuit of FIG. 31 is an already marketed product and the circuit of FIG. 33 is a new product and the I/O read bus cycle and the I/O write bus cycle are the bus cycles on an expansion board to be connected to the option slot provided in these information processing. devices. Further, it is assumed that an expansion board has been designed for an already marketed product, i.e., it is assumed that the expansion board has been designed so that the respective signals have the timings of the bus cycles T32 and T34 in FIG. 32. But each of bus cycles T22, T24 in FIG. 34 are given one wait to agree with the bus cycles T32, T34 only in the bus cycle period but differ from the bus cycles T32, T34 in other points. Compared with only the bus cycle T24, the pulse width of an $\overline{IOW}$ signal, for example, is different from that of the bus cycle T34, i.e., the pulse width of the bus cycle T34 is 125 ns, but that of the bus cycle T24 is 167 ns. The setup time and the hold time for data to be written via D15-DO for the $\overline{IOW}$ signal are different from those of the bus cycle T34. Thus, some expansion boards will not operate in connection with a new product based upon the operation of circuit of FIG. 33.

On the other hand, a microprocessor will be discussed from a viewpoint other than that from which has been discussed the information processing device.

The clock frequency of the microprocessor has been increased year by year in conjunction with the progress of semiconductor high speed digital design and fabrication. The information processing device manufacturers have also realized and now appreciate the importance of compatibility among their products, i.e., when an information processing device manufacturer merchandises a new version or product of their already marketed product, they take into consideration third party vendor application software and hardware, such as option boards, which already functionally operate with their marketed product, to provide their compatibility with their new version. The most common means to provide for this compatibility is to provide two frequencies is the same as that of the microprocessor of the old product and the other is the maximum operational clock frequency of the microprocessor of the new version or product. For example, in the case where the clock frequency of the microprocessor of the old product is 6 MHz, and that of the new product is 12 MHz, the new product has two clock frequencies of 6 MHz and 12 MHz, and operation is switched between these frequencies, e.g., by a switch. Usually new products are operated at the clock frequency of 12 MHz, but when an application program for the old product does not operate properly at the higher frequency of the new product due to a difference in processing speed, the clock frequency is switched to 6 MHz. Thus, the compatibility between the old and the new products can be assured by this approach. Thus, relative to these circumstances, the clock frequency switching circuit of the microprocessor has become an important function.

FIG. 35A is an example of a conventional clock frequency switching circuit for switching clock frequencies of microprocessor 1, such as an INTEL 80C286. The maximum clock input frequency is 24 MHz. This 80C286 microprocessor requires a clock of a frequency twice the internal operational speed and the microprocessor having the maximum clock input frequency of 24 MHz is called a CPU 12 MHz version. Oscillation circuit 306 provides an output frequency signal of 48

MHz called CLKI. A switch 305 provides the switching operation for the clock frequency of CPU 1. When switch 305 is in its lower position, signal S is of low level (L). When switch 305 is in its higher position, signal S is of high level (H). Flip flop (FF) 312 synchronizes signal S to produce a signal $C_A$. Frequency dividing circuit 307 functions as a frequency bisecting circuit when the signal $C_A$ is L. When signal $C_A$ is H, circuit 307 functions as a frequency quartering circuit. Frequency dividing circuit 307 comprises two FFs. When their Q outputs are represented by $Q_A$ and $Q_B$ respectively, with $C_A=L$, $(Q_A,Q_B)$ changes from (0,0) to (1,1) and to (0,0), and with $C_A=H$, $(Q_A,Q_B)$ changes from (0,0) to (1,0), to (1,1), to (0,1) and to (0,0). This state transition is illustrated in FIG. 35C.

With reference to the general operation of the conventional information processing device of FIG. 35A, when the switch 305 is in its lower position, $C_A=L$, frequency dividing circuit 307 functions as a frequency bisecting circuit. As a result, the frequency of the CLKO signal for CPU 1 is 24 MHz as compared to the frequency of 48 MHz of the CLKI signal to circuit 307. When switch 305 is in its higher position, $C_A=H$, and frequency dividing circuit 307 functions as a frequency quartering circuit. As a result, the frequency of the CLKO signal is 12 MHz, i.e., frequency dividing circuit 307 in FIG. 35A switches the frequency between 24 MHz and 12 MHz to supply designated clock pulses to the CPU clock terminal. Here, as shown in FIG. 35B, $C_A=0$ means the same as $C_A=L$, and $C_A=1$ means the same as $C_A=H$. FIG. 35C is state transition diagram for the circuit of FIG. 35A. FIG. 35D illustrates the timing relationship relative to signals CLKI, S, $C_A$, $Q_A$ and CLKO.

FIG. 36 is another conventional method for switching between different frequencies of operation. In this conventional method, respective outputs CLKI 1 and CLKI 2 from two different oscillation circuits 316, 326 are switched by clock switching circuit 317 to supply either of these clock frequencies as an output, CLKO. Oscillation circuit 316 provides an output frequency of 24 MHz and oscillation circuit 326 provides an output frequency of 12 MHz. Oscillation circuits 316, 326 oscillate independently of each other and are not synchronized. Accordingly, there is a danger that pulses of a narrow width are provided as an output, CLKO, when the clock rate is switched. Clock switching circuit 317 is, therefore, provided with a device to prevent the output of pulses not having the required specifications.

Thus, in the conventional approach provided in FIG. 35A, the oscillation circuit having a frequency as high as 48 MHz for original maximum oscillation is necessary in order to supply to CPU clock rates of 24 MHz and 12 MHz but comes at the expense of providing improper waveforms, particularly with narrower pulse shapes. In the conventional method of FIG. 36, two oscillation circuits are necessary but with a lower original maximum oscillation frequency compared to FIG. 35A. However, there is also the disadvantage of producing improper clock waveforms for the CPU. In addition, the costs of these circuits are high. Furthermore, clock switching circuit 317 is complicated, because two different unsynchronized two clock signals (CLKI 1, CLKI 2) are being switched.

Its a primary object of this invention to provide for dynamic or on-the-fly changing of bus cycle timing for a CPU in an information processing device in accordance with required changes in the clock frequency of operation of the CPU.

Another object of this invention is to provide a method for increasing the clock frequency of a CPU in the product design of new information processing devices which have been designed with higher operational frequencies to be compatible with higher frequencies of certain I/O devices, such as high speed memories, with shortened bus cycles thereby increasing the overall processing speed of the new product, while providing for compatibility with the timing relationships of clock dependent operational signals and cycles of such a new product with those of an older such product without limiting the operational frequency exclusively to the time periods for bus cycles required for timing compatibility for older applications provided via the device option slot, e.g., those corresponding to the I/O read bus cycle and the I/O write bus cycle of the conventional type and explained with reference to FIGS. 31–34.

Another object of this invention is to provide an information processing device with an innovative clock circuit which successfully provides for reduced costs over the frequency switching solutions of the prior art of FIGS. 35 and 36 while solving problems encountered in the prior art in providing the correct clocking signal waveform and frequency.

SUMMARY OF THE INVENTION

According to this invention, means are provided for decreasing the frequency of the CPU clock per se instead of employing or imposing a wait period or command on the CPU, i.e., the clock frequency is increased for a bus cycle for an I/O device, such as a High speed memory unit and the clock frequency is decreased for a bus cycle for an I/O device operating at a lower speed. Thus, the clock frequency is dynamically changed in accordance with the type of bus cycle to be executed.

In general, this invention relates to an information processing device including a CPU comprising an oscillation circuit for providing pulse signals having a predetermined frequency, a frequency conversion instruction circuit for receiving a state discrimination signal supplied by CPU and generating a frequency conversion instruction signal as a function of the state discrimination signal and a frequency converting circuit for receiving and converting the oscillation circuit pulse signals in accordance with the frequency conversion instruction signal and providing frequency converted pulse signals whereby the CPU receives the frequency converted pulse signals as a clock signal. According to this invention, the operational clock of the CPU can be dynamically switched so that the CPU will be compatible "on-the-fly" with I/O devices of either high operational speed or low operational speed.

This invention further relates to a microprocessor, which is supplied with pulse signals having a predetermined frequency by an outside oscillation circuit to its clock input terminal, having means to change the frequency of the operational clock in the microprocessor generated by the pulse signals in accordance with the type or kind of bus cycle to be executed by the microprocessor.

Furthermore, this invention includes a clock control circuit which deletes output pulses from the oscillation circuit at a set ratio. Thus, an information processing device of this invention includes a microprocessor having two or more different operational speed modes and a clock input terminal, and a clock control circuit for supplying clock pulses of two or more different frequencies. The clock control circuit comprises a clock frequency instruction means for selecting a frequency of the clock pulses, an oscillation circuit for providing pulse signals of a predetermined frequency, a deletion ratio control circuit for producing a deletion ratio control signal for deleting at a selected ratio preselected ones of the output pulses from the oscillation circuit and a clock pulse ON/OFF control circuit for disabling or enabling output pulses from the oscillation circuit based on the deletion ratio control signal. The deletion ratio provided by the deletion ratio control circuit is changed in accordance with an instruction from the clock frequency instruction means to control the frequency of the clock to be supplied to the microprocessor.

According to this invention, two or more kinds of clock signals can be produced by deleting pulse signals which enables an information processing device to be designed without experiencing inaccurate clock signal waveforms.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a block diagram of the information processing device according to a first embodiment of this invention.

FIG. 2 is timing diagram relative to the operation of the information processing device according to the first embodiment.

FIG. 3 is a block diagram of the information processing device according to a second embodiment of this invention.

FIG. 4 is a general block diagram of the information processing device according to various embodiments of this invention.

FIGS. 5A-5C are views explaining a first embodiment of a frequency converting circuit relative to this invention.

FIGS. 6A and 6B are views explaining the state transition of the second embodiment of the frequency converting circuit relative to this invention.

FIGS. 7A-7C are views of the second embodiment of a frequency converting circuit relative to this invention.

FIGS. 8A-8C are views explaining the state transition of the second embodiment of the frequency converting circuit relative to this invention.

FIGS. 9A-9C are views explaining the third embodiment of a frequency converting circuit relative to this invention.

FIGS. 10A-10C are views explaining the state transition of a third embodiment of the frequency converting circuit relative to this invention.

FIGS. 11A-11E are views explaining the fourth embodiment of the frequency converting circuit relative to this invention.

FIGS. 12A-12E are views explaining the fifth embodiment of a frequency converting circuit relative to this invention.

FIGS. 13A-13E are views explaining the sixth embodiment of a frequency converting circuit relative to this invention.

FIGS. 14A-14D are views explaining the state transition of the seventh embodiment of a frequency converting circuit relative to this invention.

FIGS. 15A and 15B are views explaining the eighth embodiment of a frequency converting circuit relative to this invention.

FIGS. 16A-16E are views explaining the ninth embodiment of a frequency converting circuit relative to this invention.

FIGS. 17A-17E are views explaining the tenth embodiment of a frequency converting circuit relative to this invention.

FIGS. 18A-18E are views explaining the eleventh embodiment of a frequency converting circuit relative to this invention.

FIGS. 19A-19D are views explaining the twelfth embodiment of a frequency converting circuit relative to this invention.

FIG. 21 is a circuit diagram of a second embodiment of a frequency conversion instruction circuit relative to this invention.

FIG. 22 is a circuit diagram of a third embodiment of a frequency conversion instruction circuit relative to this invention.

FIG. 23 is a circuit diagram of a fourth embodiment of a frequency conversion instruction circuit relative to this invention.

FIG. 24 is a circuit diagram of a fifth embodiment of a frequency conversion instruction circuit relative to this invention.

FIG. 25 is a timing diagram relative to the operation of the various embodiments of the frequency conversion instruction circuit.

FIG. 26 is a block diagram of the microprocessor according to a first embodiment of this invention.

FIG. 27 is a block diagram of the microprocessor according to a second embodiment of this invention.

FIG. 28 is a block diagram of an information processing device employing the microprocessors according to the embodiments of FIGS. 26 and 27.

FIG. 29A is a block diagram of the information processing device employing a clock control circuit according to one embodiment.

FIGS. 29B-29E are views for the purpose of explaining the operation of the FIG. 29A embodiment.

FIG. 30 is a block diagram of an embodiment of clock frequency instruction means.

FIG. 31 is a block diagram of a referenced information processing device.

FIG. 32 is a timing diagram relative to the operation of the referenced information processing device.

FIG. 33 is a block diagram of a conventional information processing device.

FIG. 34 is a timing relative the operation of the conventional information processing device of FIG. 33.

FIGS. 35A-35D are views for the purpose of explaining a first type of clock control of a conventional information processing device.

FIG. 36 is a view for the purpose of explaining a second type of clock control of a conventional information processing device.

DESCRIPTION OF THE PREFERRED EMBODIMENTS

Figure 20:
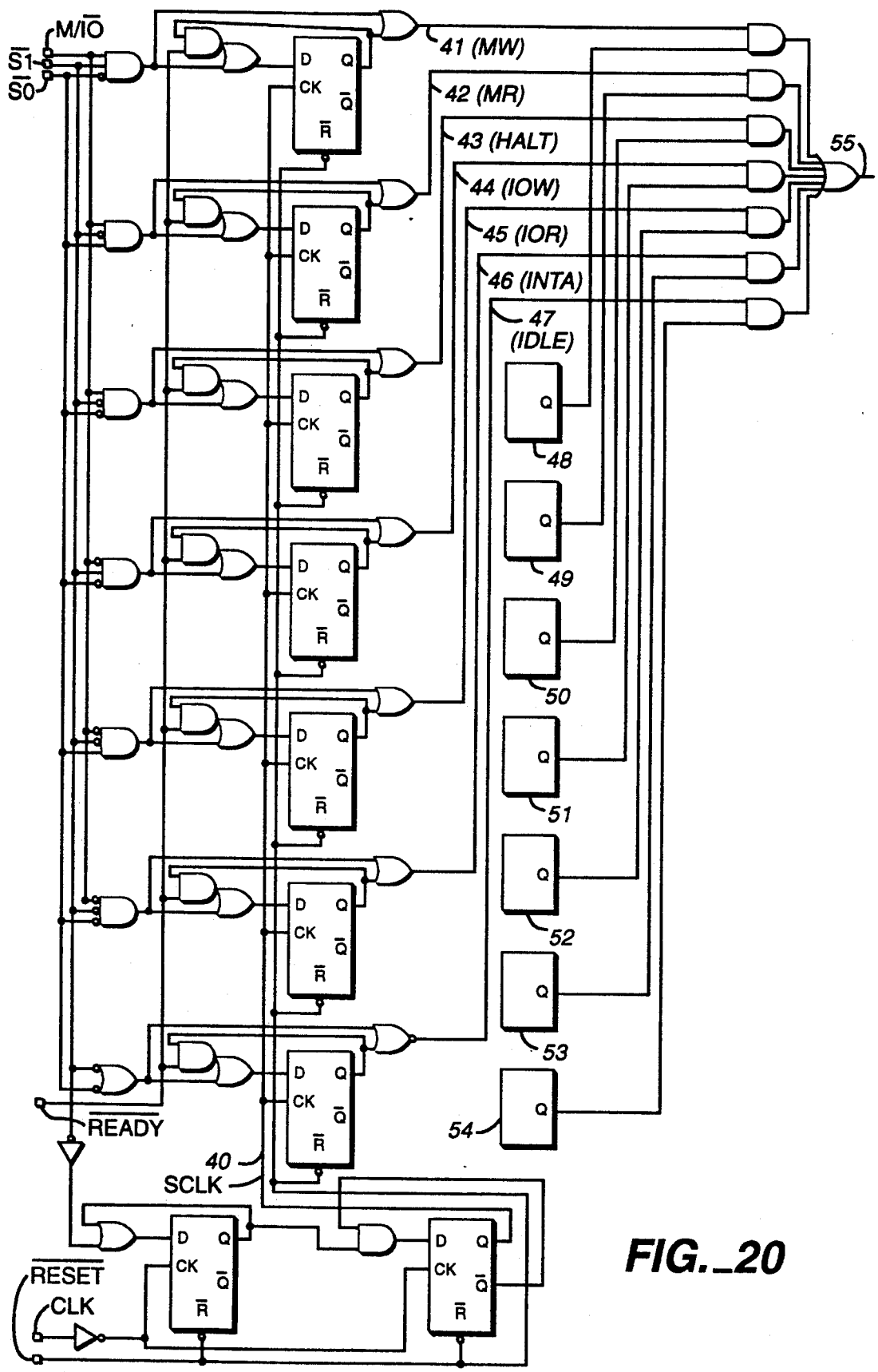
FIG. 20 is a circuit diagram of a first embodiment of a frequency conversion instruction circuit relative to this invention.

Reference is now made to FIG. 1 wherein CPU 1 is a 12 MHz version of the INTEL microprocessor 80286. Command decoder 2 is completely the same as in FIG. 31. The $\overline{R}, \overline{E}, \overline{A}, \overline{D}, \overline{Y}$ signal of CPU 1 is fixed low as in FIG. 31. Only one difference of the information processing device according to the embodiment of FIG. 1 from that of FIG. 31 is the circuit for producing a CLK signal of CPU 1. The oscillation frequency of oscillation circuit 3 is 48 MHz. Frequency dividing circuit 4 in FIG. 1 is a switchable frequency trisecting/bisecting circuit. Frequency dividing circuit 4 functions as the frequency bisecting circuit when a frequency conversion instruction signal B is at a low level. When the frequency conversion instruction signal B is at a high level, circuit 4 functions as the frequency trisecting circuit. The frequency of the output pulse of oscillation circuit 3 is converted by frequency converting circuit 4, and the output pulse C of circuit 4 becomes the clock signal of CPU 1. In other words, when the frequency conversion instruction signal B is of a low level, the clock of 48 MHz is bisected and the pulse signal C of 24 MHz becomes the clock of CPU 1. When the frequency conversion instruction signal B is of a high level, the clock of 48 MHz is trisected and the pulse signal C of 16 MHz becomes the clock of the CPU 1. A frequency conversion instruction circuit 5 discriminates relative to the type bus cycle to be executed by CPU 1, based on a state discrimination signal of the CPU, i.e., M/$\overline{IO}$, $\overline{SI}$, $\overline{SO}$, to output a proper frequency conversion instruction signal B corresponding to each bus cycle. In this embodiment, the frequency conversion instruction signal B becomes low for a memory bus cycle, e.g., a memory read bus cycle or a memory write bus cycle, and the frequency conversion instruction signal B becomes high for I/O bus cycle, i.e., an I/O read bus cycle or an I/O write bus cycle. In other words, during a memory bus cycle, if the output B of the frequency conversion instruction signal B is low and the frequency converting circuit 4 functions as the frequency bisecting circuit, the frequency of output C is 24 MHz. During the I/O bus cycle, if the output B of frequency conversion instruction circuit 5 is high and frequency converting circuit 43 functions as the frequency trisecting circuit, the frequency of output C is 16 MHz. Signal A in frequency conversion instruction circuit 5 decodes the state discrimination signals M/$\overline{IO}$, $\overline{SI}$, $\overline{SO}$ provided by CPU 1 during the clock cycles TS to detect the memory bus cycle. The memory bus cycle is extended by two flip-flops so that the frequency conversion instruction signal B is provided as a stable output during the bus cycle. Signals A and B in frequency conversion instruction circuit 5 are illustrated relative to FIG. 2.

Thus, in the embodiment of FIG. 1, while CPU 1 is executing the memory bus cycle, the frequency of the CPU clock is 24 MHz while CPU 1 is operating at 12 MHz. The frequency of the CPU clock is 16 MHz while a I/O bus cycle is being executed and CPU 1 is operating at 8 MHz.

FIG. 2 illustrates the timing of the same four bus cycles of the conventional device if FIG. 34 and the referenced device of FIG. 32 executed by CPU 1 relative to this embodiment wherein the frequency of the CPU clock is switched dynamically. The frequency of the clock of CPU 1 is 24 MHz in the memory read bus cycle T11 and the memory write bus cycle T13, the $\overline{R}$, $\overline{E}, \overline{A}, \overline{D}, \overline{Y}$ is low with no inserted wait period and the respective bus cycle periods are 167 ns. This is the same as in the memory read bus cycle T21 and the memory write bus cycle T23 of FIG. 34. The frequency of CLK of CPU 1 is 16 MHz in the I/O read bus cycle T12 and in the I/O write bus cycle T14 and is decreased compared with that of the memory bus cycle of FIG. 34. In the embodiment of FIG. 1, the $\overline{R}, \overline{E}, \overline{A}, \overline{D}, \overline{Y}$ is low with no inserted wait period in the I/O bus cycle. Accordingly the bus cycle periods of the I/O read and write bus cycles are 250 ns.

In the bus cycle period, the I/O bus read and write cycles T22, T24 for the conventional device of FIG. 34 and those cycles T12, T14 of FIG. 2 for this embodiment are equal. In the timing of the respective signals in the bus cycle, however, there are decisive differences. The timings of the respective signals in the I/O read and write bus cycles of FIG. 2 are completely the same as those of the respective signals in the I/O read and write bus cycles T32, T34 in the timing diagram of FIG. 32 of the referenced information processing device. This is achieved by making CLK of CPU 1 in an I/O bus cycle in the embodiment of FIG. 1 agree with that of CPU 21 at the time of execution of an I/O bus cycle in the embodiment of FIG. 31. This is a significant improvement in that the I/O bus cycle T22, T24 in FIG. 34 were in agreement with the I/O bus cycle T32, T34 in FIG. 32 only in the bus cycle period but could not be in agreement relative to the timing of the respective signals during the bus cycles.

FIG. 3 is a block diagram of the information processing device according to a second embodiment of this invention. In this embodiment, frequency conversion instruction circuit 35 is a partial modification of frequency conversion instruction circuit 5 in the first embodiment of FIG. 1. In the embodiment of FIG. 1, frequency conversion instruction circuit 5 receives only the state discrimination signals (M/$\overline{IO}$, $\overline{SI}$, $\overline{SO}$), and accordingly the frequency conversion instruction signal B is a function of only the state discrimination signals. In contrast to this, frequency conversion instruction circuit 35 in FIG. 31 receives addresses (A23, A22) of the CPU 1 in addition to the state discrimination signals (M/$\overline{IO}$, $\overline{SI}$, $\overline{SO}$). Accordingly frequency conversion instruction signal 39 is a function of the state discrimination signals and the addresses. Gate 36 is for decoding the addresses, and the output of the gate becomes high only when A23=A22=0. In the embodiment of FIG. 3, the frequency of CLK of CPU 24 MHz only when CPU 1 executes a memory read bus cycle (M/$\overline{IO}$, $\overline{SI}$, $\overline{SO}$=1,0,1) or a memory write bus cycle (M/$\overline{IO}$, $\overline{SI}$, $\overline{SO}$=1,1,0) for the address region where A23=A22=0. At the time other than this, i.e., the memory bus cycle for the address region where A23=A22=0 does not hold, and all the bus cycles other than the memory bus cycle, the frequency of CLK of the CPU clock is 16 MHz.

FIG. 4 is a general block diagram of the information processing device according to the embodiments of this invention. Compared with the reference information processing device of FIG. 31, it is seen that the device of FIG. 4 further includes frequency converting circuit 104 and frequency converting circuit 105.

FIGS. 5 and 6 explain the structure and operation of frequency converting circuit 4 of the information processing device of FIG. 1. FIG. 5A has taken out the frequency converting circuit alone for its explanation, but the names of the signals are a little different. The frequency conversion instruction signal represented by B in FIG. 1 is indicated by ax in FIG. 5A, and the clock output of the frequency converting circuit represented by C in FIG. 1 is indicated by $C_{OUT}$ in FIG. 5A. Flip-flops (FFs) 101, 102 function as a frequency dividing circuit. The frequency dividing ratio is controlled based on the value of the frequency conversion instruction signal ax. FIG. 5B illustrates the relationships among the frequency conversion instruction signal ax, the frequency dividing ration, and the clock output $C_{OUT}$, and FIG. 5C illustrates their timing diagram. When the Q outputs of the FFs 101, 102 are represented by $Q_A$, $Q_B$, the state transition of the Q outputs $Q_A$, $Q_B$ is shown in FIG. 6. FIG. 5A is for ax=0. FIG. 5B is for ax=1.

FIGS. 7 and 8 are views of the frequency converting circuit according to a second embodiment. In this embodiment, the frequency converting circuit has three frequency dividing ratios of ½, ⅓ and ¼. Frequency converting circuit 41 in FIG. 7A takes the place of frequency converting circuit 4 in FIG. 1. However, frequency converting circuit 41 has three frequency dividing ratios, and accordingly two frequency conversion instruction signals ax, bx are necessary.

Accompanying the replacement of the frequency converting circuit 4 of the information processing device of FIG. 1 by the frequency converting circuit 41, the frequency conversion instruction circuit 5 has to be replaced by a different frequency conversion instruction circuit so that this circuit supplies the two frequency conversion instruction signals. A number of examples of this frequency conversion instruction circuit can be conceived with ease, but they are not explained because they are irrelevant to the substance of this invention.

FIG. 7B illustrates the relationships of the frequency conversion instruction signals ax, bx with FFs 103, 104 which function as the frequency bisecting/trisecting-/quartering circuits in accordance with values of the frequency conversion instruction signals ax, bx. FIG. 7C illustrates their timing diagram. FIG. 7A illustrates the case where the frequency of the signal C48M of an oscillation circuit is 48 MHz, but its frequency is not limited to 48 MHz. FIGS. 8A, 8B and 8C are views of the state transition of $Q_A$, $Q_B$ when the Q outputs of the FFs 103, 104 are represented by $Q_A$ and $Q_B$. FIG. 8A illustrates the case where ax=1, bx=0, FIG. 8B illustrates the case where ax=1, bx=1, and FIG. 8C illustrates the case where ax=1, bx=1.

FIGS. 9A-9C and 10A-10C illustrate the frequency converting circuit according to a third embodiment. The frequency converting circuit is represented by 42 in FIG. 9A. This frequency converting circuit 42 is very similar to the 41 of FIG. 7A but is partially modified. What is modified is the duties of the low and the high periods of the waveform of a clock output ($C_{OUT}$). In FIG. 7A, the duty of the clock output $C_{OUT}$ is 1:1 for the bisection, 1:2 for the trisection, and 2:2 for the quartering. In FIG. 9A, the duty of the clock output $C_{OUT}$ is 1:1 for the bisection, 1:2 for the trisection, and 1:3 for the quartering, and all the duties are 1:m−1 where m represents a frequency dividing ratio.

FFs 105, 106 in FIG. 9A are completely the same circuits as FFs 103, 104. The operation of FFs 105, 106 in response to the signals ax, bx are also completely the same. But the embodiment of FIG. 9A includes another FF 107. FF 107 controls the duties of the output $C_{OUT}$ to be 1:m−1. FIG. 11B illustrates the relationships among the signals ax, bx, the output $C_{OUT}$ and the frequency dividing ratios, and FIG. 11C illustrates their timing diagram. FIG. 10 is a view of the state transition of the Q outputs $Q_A$, $Q_B$, $Q_C$ of the FFs 105, 106, 107.

FIGS. 11A-11E explain the frequency converting circuit according to a fourth embodiment. FIG. 11A is a circuit diagram of the frequency converting circuit, and CLKI, CLKO and $C_A$ represent the clock input, clock output and the frequency conversion instruction signal of the frequency converting circuit respectively. In the frequency converting circuit of FIG. 11A, the frequency of CLKO is the same as that of CLKI when $C_A$=0. When $C_A$=1, the former is ½ of the latter. In other words, when the frequency of CLKI is represented by f, the frequency converting circuit of FIG. 11A prepares the frequencies of f and f/2. This relationship is shown in FIG. 11B. A characteristic of the circuit of FIG. 11A is that CLKI pulses are deleted at a certain ratio to convert the frequency to produce CLKO, which is a large difference from the frequency converting circuits of FIGS. 5A, 7A and 9A in which the clock input is divided to supply a resultant divided output as the clock output.

The operation of the frequency converting circuit of FIG. 11A will be briefly explained below. In the circuit of FIG. 11A, FF 200 functions as a counter for producing a ratio at which are deleted the CLKI pulses. Circuit 220 is a deleting ratio control counter and provides deleting ratio control signal 230. Clock pulse ON/OFF control circuit 240 is provided by an OR gate. When deleting ratio control signal 230 is of low level (L), CLKI passes clock pulse ON/OFF control circuit 240 as it is, to be CLKO. When deleting ratio control signal 230 is of high level (H), CLKI is stopped by OR gate 240, with CLKO fixed H, and no clock pulse is provided. When the frequency conversion instruction signal $C_A$ is L, the output of FF 200 is always L, accordingly with deleting ratio control signal 230 being L. In other words, when the frequency conversion instruction signal $C_A$ is L, CLKO=CLKI. When the frequency conversion instruction signal $C_A$ is H, deleting ratio control counter 220 is a binary counter, and deleting ratio control signal 230 is inverted every time one pulse of CLKI is supplied to counter 220 and repeats L and H alternately. In other words, when the frequency conversion instruction signal is H, every two pulses of CLKI are deleted to be provided as CLKO. When the frequency of CLKI is represented by f, that of CLKO becomes f with $C_A$=L and becomes f/2 with $C_A$=H.

FIGS. 11C and 11D are the state transition view and table respectively explaining the operation of the deleting ratio control counter. In the state transition view of FIG. 11C, when the state is S0, the pulse of CLKI passes the clock pulse ON/OFF control circuit, or OR gate 240, and when the state is S1, the pulse of CLKI is stopped by OR gate 240. FIG. 11E is the timing diagram of the operation of the circuit of FIG. 11A. This diagram is of the case in which three bus cycles are executed. In the first and the third bus cycles, the frequency of CLKO is f, and in the second bus cycle that of CLKO is f/2. The frequency conversion instruction signal $C_A$ has the value given for the respective bus cycles and is produced by the frequency conversion instruction circuit. In this embodiment, it is assumed that the frequency conversion instruction signal $C_A$ has become stable by the timing $T_a$ of the rise of the first CLKI pulse after a next bus cycle has started, and retains its correct value until the bus cycle finishes.

FIGS. 12A–12E illustrate the frequency converting circuit according to a fifth embodiment, which is also a major portion of a clock control circuit according to this invention. FIG. 12A is a circuit diagram of this frequency converting circuit. The major portion corresponds to another embodiment of deleting ratio control circuit 7 and clock pulse ON/OFF control circuit 11 relative to the circuit of FIG. 29A to be explained later. The other portion which is not shown in FIG. 12A is the same as those of FIG. 29A. Deleting ratio control circuit 221 comprises two FFs 201, 202. Deleting ratio control signal 231 is supplied to OR gate 241 which is a clock pulse ON/OFF control circuit. The Q outputs of FFs 201, 202 are represented by $Q_B$, $Q_A$. When the frequency conversion instruction signal $C_A=L$, always $(Q_B, Q_A)=(0,0)$, and deleting ratio control signal 231 is always L. At this time, all the CLKI pulses passes OR gate 241, and CLKO agrees with CLKI. In other words, when the frequency of CLKI is represented by f, with $C_A=L$, the frequency of CLKO becomes f. With $C_A=H$, $(Q_B,Q_A)$ changes from (0,0) to (0,1) to (1,0) and to (0,0), and deleting ratio control circuit 221 functions as a frequency trisecting circuit. At this time, deleting ratio control signal 231 becomes L, i.e., enabled, once three times. Only at this time, the pulses of CLKI pass OR gate 241, and at the other time, they cannot pass OR gate 241. In other words, only ⅓ of the pulses of CLKI pass OR gate 241, and the remaining ⅔ of them is deleted by OR gate 241, and the frequency of CLKO becomes f/3. Thus, when the frequency of CLKI is represented by f, the frequency f of CLKO is f when the frequency conversion instruction signal $C_A$ is L. When the frequency conversion instruction signal $C_A$ is H, the frequency of CLKO is f/3 (FIG. 12B).

The above described operation is illustrated in a timing diagram in FIG. 12E wherein the first and second bus cycles are illustrated respectively as the high speed and low speed modes. FIG. 12B illustrates the relationship between the frequency conversion instruction signal $C_A$ and CLKO via a conversion table. FIGS. 12C and 12D are respectively state transitions and a conversion table for deleting ratio control circuit 221.

FIGS. 13A–13E illustrate the frequency converting circuit according to a sixth embodiment as well as a clock control circuit. FIG. 13A is a circuit diagram of this frequency converting circuit. The relationship between the frequency conversion instruction signal $C_A$ and CLKO is shown in FIG. 13B. As shown in FIG. 13B, when the frequency conversion instruction signal $C_A=L$, the frequency of a signal CLKO becomes f, i.e., the same as that of an output CLKI. When $C_A=H$, the frequency of CLKO becomes f/4. FIGS. 13C and 13D are respectively state transitions and a conversion table for deleting ratio control counter 222. FIG. 13E is a timing diagram for the circuit of FIG. 13A wherein the first and second bus cycles are illustrated respectively as the high speed and low speed modes.

FIGS. 14A–14E illustrate the frequency converting circuit according to a seventh embodiment as well as a clock control circuit for this invention. In FIG. 14A, $C_B$, $C_A$ represent two signals instructing frequencies of the clock, and four frequencies can be instructed. When $(C_B,C_A)=(0,0)$, the Q outputs $(Q_B,Q_A)$ of FFs 205, 206 are always (0,0), and a deleting ratio control signal 233 becomes always L. At this time, all the pulses of a signal CLKI pass OR gate 243 which is a clock pulse ON/OFF circuit and the frequency of a signal CLKO becomes f, i.e., the same as the frequency of CLKI. When $(C_B,C_A)=(0,1)$, $(Q_B,C_A)$ changes from (0,0) to (0,0), to (0,1) and to (0,0), and deleting ratio control circuit 223 functions as a frequency bisecting circuit. At this time, deleting ratio control signal 233 becomes L, i.e., enabled, once two times, and the pulses of CLKI are deleted by ½ (50%) by OR gate 243. The frequency of CLKO becomes f/2. When $(C_B, C_A)=(1, 0)$, $(Q_B, Q_A)$ changes from (0, 0) to (0, 1) to (1, 0) and to (0, 0), and the deleting ratio control circuit functions as a frequency trisecting circuit. At this time, deleting ratio control signal 233 becomes L, i.e., enabled, once three times, and the CLKI pulses are deleted by ⅔ (66.67%) by OR gate 243. The frequency of CLKO becomes f/3. when $(C_B, C_A)=(1, 1)$, $(Q_B, Q_A)$ changes from (0, 0) to (0, 1) to (1, 0) to (1, 1) and to (0, 0), and deleting ratio control circuit 223 functions as a frequency quartering circuit. At this time, deleting ratio control signal 233 becomes 1, i.e., enabled, once four times, and the pulses of CLKI are deleted by ¾ (75%) by OR gate 243. The frequency of CLKO becomes f/4.

Thus, this circuit can output four different frequencies as CLKO in accordance with two frequency conversion instruction signals $C_B$, $C_A$. The relationships among the two frequency conversion instruction signals $C_B$, $C_A$ and the four frequencies of CLKO are shown in FIG. 14B. FIGS. 14C and 14D respectively illustrate state transitions and conversion table for deleting ratio control circuit 223.

FIGS. 15A and 15B illustrate the frequency converting circuit according to an eighth embodiment as well as a clock control circuit. FIG. 15A illustrates deleting ratio control circuit 224 and clock pulse ON/OFF control circuit 244 for generating 16 different kinds of clocks, CLKO, based on four clock frequency instruction signals $C_D$, $C_C$, $C_B$, $C_A$. The operation of this embodiment is easily understood with reference to FIG. 15A. The relationship between the clock frequency instruction signals $C_D$, $C_C$, $C_B$, $C_A$ is shown in the table in FIG. 15B. This circuit can output sixteen frequencies as CLKO in accordance with four frequency conversion instruction signals $C_a$, $C_C$, $C_B$, $C_A$.

FIGS. 16A–16E illustrate the frequency converting circuit according to a ninth embodiment. FIG. 16A is a circuit diagram of this frequency converting circuit. The relationship between the frequency conversion instruction signal $C_A$ and CLKO is shown in FIG. 16B, which is the same as in FIG. 11B. The ninth embodiment of FIG. 16A has the same function as the fourth embodiment of FIG. 11A. In both embodiments, the frequency of CLKO is two, f and f/2. But there is one large difference between the two embodiments. The difference is the time from the start of a bus cycle to the time when the frequency conversion instruction signal $C_A$ becomes stable at a correct value. In the embodiment of FIG. 11A, the correct value of the frequency conversion instruction signal $C_A$ is provided by the time of the timing $T_1$ of the rise of the first CLKI pulse after a bus cycle has started. In contrast to this in the ninth embodiment, the correct value of the frequency conversion instruction signal $C_A$ is not provided by the timing $T_1$ but is provided by the timing $T_2$ of the fall of the CLKI pulse next to the timing $T_1$. In this case, the state transition view as in FIG. 11C in which the state SO is branched to the state SO ($C_A=0$) or the state SI ($C_A=1$), depending on the values of the frequency conversion instruction signal $C_A$, and since at this time the frequency conversion instruction signal $C_A$ has not yet become correct, the state SO has to be unconditionally branched to the state SI. Then, the state transition view of FIG. 16C is prepared. In FIG. 16C, "1" means the unconditional branching.

This difference makes deleting ratio control counter 320 of the ninth embodiment a little different from that of counter 220 in FIG. 11A. Since counter 220 in FIG. 11A passes the CLKI pulse in the state SI ($Q_A=0$) and stops the CLKI pulse in the state SI ($Q_A=1$), counter 220 is provided by the clock pulse ON/OFF control circuit which gives a logical sum of deleting ratio control signal 230 indicative of states other than the state SI and CLKI. In contrast to this, in FIG. 16A, it is not in states other than the state SO that the CLKI pulse is always stopped but in states other than the state SO and besides where $C_A=1$. Then a clock ON/OFF control circuit, such as OR gate 340, is necessary. FIGS. 16C and 16D are the state transition view and table of deleting ratio control counter 320. FIG. 16E is the timing diagram of the circuit of FIG. 16A.

FIGS. 17A-17E illustrate the frequency converting circuit according to a tenth embodiment. This embodiment has the same function as the fifth embodiment of FIGS. 12A-12E. In the embodiment of FIG. 12A, the correct value of the frequency conversion instruction signal $C_A$ has been provided by the timing $T_1$, but in this embodiment of FIG. 17A, the correct value of a frequency conversion signal $C_A$ has been provided by the timing $T_1$ but $T_2$. This embodiment is intended for this timing difference of the frequency conversion instruction signal $C_A$. FIG. 17B illustrates the relationship between the frequency conversion instruction signal $C_A$ and a clock signal CLKO. FIGS. 17C and 17D are the state transition view and table of deleting ratio control counter 321. FIG. 17E is the timing diagram of the circuit of FIG. 17A.

FIGS. 18A-18E and FIGS. 19A-19E illustrate the frequency converting circuit according to an eleventh and twelfth embodiments re-CPU usually executes the memory read bus cycle, memory write bus cycle, I/O read bus cycle, I/O write bus cycle, interrupt acknowledge cycle, hold cycle, etc. and accesses outside. But when the CPU is busy with the internal processing, e.g., is executing a multiplication/division instruction, there occurs a state where no access is made to the outside. This state is the idle cycle, which is detected by the signal 47. FIG. 34 illustrates the timings for the case in which idle cycles are inserted each between the I/O write bus cycle C2 and the interrupt acknowledge cycle C4, and between the memory read bus cycle C5 and the memory write bus cycle C7. The period of the idle cycle is determined by a state of the internal processing of the CPU. Store means 48 stores the information (frequency conversion instruction information) which determines the frequency of the CPU clock at the time of execution of the memory write bus cycle. When the CPU executes the memory write bus cycle, signal 41 becomes high, and the information stored in store means 48 is provided as frequency conversion instruction signal 55 and is supplied to the frequency converting circuit. Store means 49-54 are for storing frequency conversion instruction information corresponding to the memory read bus cycle, hold cycle, I/O write bus cycle, I/O read bus cycle, interrupt acknowledge cycle and idle cycle. Store means 48-54 are provided by DIP switches, registers, ROMs, RAMs, or others. FIG. 20 illustrates an example of the frequency conversion instruction circuit having the store means provided by registers. The use of registers, RAMs or others as the store means allows the frequency conversion instruction information to be set in the store means by programs (software).

FIGS. 21-24 are block diagrams of a second-a fifth embodiments of the frequency conversion instruction circuit used in the information processing device of this invention.

The second embodiment of FIG. 21 differs from the first embodiment of FIG. 20 only in that in the former the frequency conversion instruction information corresponding to the respective bus cycles and the idle cycle are 2 bits, and is the same as the latter in the other respects. Store means 56 stores the 2 bits of the frequency conversion instruction information corresponding to the memory write bus cycle. This 2-bit-information is provided to output lines 63, 64 as a frequency conversion instruction signal when the CPU executes the memory write bus cycle. Store means 57-62 store frequency conversion instruction information corresponding to the respective cycles.

In a third embodiment shown in FIG. 22, the respective bus cycles are combined with addresses. Gate 88 produces signals for latching addresses from the state discrimination signals $\overline{SI}$, $\overline{SO}$. Latch 79 latches address A23, A22, A9, A8. The latched addresses are decoded by gates 80, 81. Gate 80 divides the memory into regions. The output of gate 80 becomes high with A23-=A22=0. The memory region corresponding to this high output is called M1 here, and the other memory region is called M2. In other words, M1 is addresses 000000H-3FFFFFH (H is the sign indicating the hexadecimal notation) and M2 is addresses 400000H-FFFFFFH. Gate 81 divides the I/O region into two. The output of the gate 81 becomes high with A9-=A8=0. The I/O region corresponding to this high output is called I1 here, and the other region is called I2. I1 is addresses 000H-0FFH, and I2 is addresses 000H-3FFH. In this embodiment, the memory address space is 16 megabyte (MB), and the I/O address space is 1 kilobyte (KB). It is possible to subdivide the memory region and the I/O region, but for the simplicity of the explanation, in this embodiment they are divided in two regions respectively.

Gates 65, 72 are for combining the bus cycles and the address regions. Gate 65, gate 66, gate 68, gate 69, gate 70, gate 71, and gate 72 produce signals respectively indicative of the bus cycles of the memory write in M1, the memory write in M2, the memory read from M1, the memory read from M2, the I/O write in I1, the I/O write in I2, the I/O read from I1, and I/O read from I2. Store means 73-77 store frequency conversion instruction information. The store means 73 stores 4-bit-frequency conversion instruction information of the memory cycles, i.e., information corresponding to the memory write in M1, the memory write in M2, the memory read from M1, and the memory read from M2. Store means 75 stores 4-bit-frequency conversion instruction information, i.e., information corresponding to the I/O write in I1, the I/O write in I2, the I/O read from I1 and the I/O read from I2. Store means 74, 76, 77 store frequency conversion instruction information respectively corresponding to the hold cycle, interrupt acknowledge cycle, and address cycle. Signal 78 is a frequency conversion instruction signal. FIG. 23 illustrates the fourth embodiment of the frequency conversion instruction circuit.

In this fourth embodiment, the store means for storing the frequency conversion instruction information is provided by a memory device. Gates 82-84 are for encoding the respective bus cycles. The correspondence between encoded signals via gates 82-84 and the respective bus cycles is illustrated in Table 2.

TABLE 2

| Bus Cycles | 82 | 83 | 84 |
|---|---|---|---|
| Idle | 1 | 1 | 1 |
| Memory write | 1 | 1 | 0 |
| Memory read | 1 | 0 | 1 |
| Hold | 1 | 0 | 0 |
| I/O write | 0 | 1 | 0 |
| I/O read | 0 | 0 | 1 |
| Interrupt acknowledge | 0 | 0 | 0 |

The encoded signals 82-84 are connected to the upper 3 bits of memory 85. Eight address signals latched by latch 87 are connected to the lower 8 bits of memory device 85. Memory device 85 is 2 kiloword×1 bit and has 3-bit-signals indicative of the bus cycles and 8-bit-address signals inputted in, and the memory device can store frequency conversion instruction information for the respective bus cycles in 256 address regions. The address regions are significant only to the bus cycles of the memory write, memory read, I/O write and I/O read. The output of memory device 85 is frequency conversion instruction signal 86.

FIG. 24 illustrates a fifth embodiment of the frequency conversion instruction circuit. The fifth embodiment differs from the fourth embodiment in that in the former the store means for storing the frequency conversion instruction information is provided by a memory device. The memory device 90 is 4 kiloword×8 bits. Twelve address signals latched by latch 89 are address inputs to memory device 90. Memory device 90 stores frequency conversion instruction information in 4,096 address regions. The information corresponding to the respective bus cycle are stored in the respective address regions in a parallel manner in memory device 90. Data outputs 91-98 of the memory device correspond to the respective bus cycles. For example, data output 91 correspond to the memory write bus cycle, but data output 98 is an excess and is not employed. A frequency conversion instruction signal is represented by 99. Memory devices 85, 90 may be ROMs or RAMs. When RAMs are employed, it is possible to set the frequency conversion instruction information by software.

FIG. 25 illustrates the timings of the respective embodiments of the frequency conversion instruction circuit of FIGS. 20-24. Two points have to be noted. One of them is that the timings are explained with the $\overline{\text{READY}}$ signal always set low. This is for the simplicity of the explanation. If the $\overline{\text{READY}}$ signal is high, the respective bus cycles are extended by a period in which the $\overline{\text{READY}}$ signal is high. The other of them is the period of the CLK signal. In FIG. 25 CLK is always constant but actually changes dynamically in accordance with the frequency conversion instruction signals set for the respective bus cycles. But, in this case, the relationships of the respective signals with CLK are completely the same as in FIG. 34. FIG. 25 also provides the timing diagram illustrating the relationships of the respective signals with CLK.

Next, microprocessors employing the embodiments of FIGS. 1 and 2 will be described.

FIG. 26 illustrates the microprocessor according to a first embodiment. In FIG. 26, block 9 is a microprocessor, such as INTEL 80286, frequency converting circuit 4 of FIG. 1 and frequency conversion instruction circuit 5. Microprocessor 9 is supplied at clock input 7 with pulses of a constant frequency generated by oscillation circuit 3. The constant frequency is 48 MHz in this embodiment. Frequency converting circuit 4 and frequency conversion instruction circuit 5 operate in the same way as those circuits illustrated in FIG. 2. Clock signal 8 in FIG. 26 becomes 24 MHz when microprocessor 9 executes the memory bus cycles, the frequency converts to 16 MHz. The clock signal for the internal operation of microprocessor 9 is the bisected frequency of clock signal 8, and this frequency becomes 12 MHz for the memory bus cycles and 8 MHz for the I/O bus cycles. Clock signal 8 is supplied outside as the output of microprocessor 9. By checking this output, a frequency for the internal operation of the microprocessor can be known. Command duty circuit 2 is completely the same as that of the circuit of FIG. 1. The entire circuit of FIG. 26 is completely the same as that of FIG. 1, but a difference between the two circuits is that in circuit of FIG. 26 the function of changing the clock for the internal operation in accordance with the bus cycles to change the execution periods of the bus cycles is built in the microprocessor on one chip 260.

FIG. 27 illustrates the microprocessor according to a second embodiment. The microprocessors according to this second embodiment and the microprocessor of FIG. 26 differs from each other in whether frequency conversion instruction circuit 5 is inside or outside the microprocessor. In FIG. 27, frequency conversion instruction circuit 5 is outside microprocessor 19, and microprocessor 19 is supplied at input terminal 18 with frequency conversion instruction signal B from the outside. In response to this frequency conversion instruction signal B, the frequency for the internal operation of microprocessor 19 is switched. The operation of the entire circuit of FIG. 27 is the same as that of the circuit of FIG. 26.

FIG. 28 illustrates microprocessor 31 according to a third embodiment, including memory devices 31, 32, I/O devices 34, 35. Memory device 32 is a high-speed memory corresponding to a memory address region A of microprocessor 31 and is operable at a clock frequency of 12 MHz. Memory device 33 is a low speed memory corresponding to a memory address region B of memory device 33 and is operable at the clock frequency of 8 MHz. I/O device 34 corresponds to an I/O address region C and is operable at a clock frequency of 12 MHz. I/O device 35 corresponds to an I/O address region D and is operable at a clock frequency of 8 MHz. Microprocessor 31 has two frequencies of 12 MHz and 8 MHz for the internal operation. Microprocessor 31 operates at 12 MHz for the memory bus cycles with respect to the address region A and for the I/O bus cycles with respect to the address region C, and does at 8 MHz for the memory bus cycles with respect to the address region B and for the I/O bus cycles with respect to the address region D. The third embodiment of FIG. 28 and the first embodiment of FIG. 26 are very similar. But they are different from each other in that in microprocessor 9, the clock frequency for the internal operation of microprocessor 9 is determined based on the bus cycles, but in microprocessor 31, the frequency for the internal operation of microprocessor 31 is determined based on the bus cycles and the address regions.

The embodiments described above include conventional CPUs such as the INTEL 80286 and the microprocessors with the clock switching circuits built on the same chip. By designing microprocessors employing this invention initially at the start of development, the microprocessors will result in higher performance.

Next, the information processing device employing a clock control circuit according to this invention will be described.

FIG. 29A illustrates the information processing device using a clock control circuit according to a first embodiment. Microprocessor 1 is INTEL 80C886 and CLK represents its clock terminal. In this embodiment, the maximum frequency of the clock is 24 MHz. In other words, the CPU is a 12 MHz version. Clock control circuit 2 provides an output signal CLKO 3 to supply the same to the clock input of microprocessor 1. The frequency is switched based on a position of switch 5 to the one instructed by clock frequency instruction means 4. Output signal 3 becomes L when switch 5 is in its lower position. When switch 5 is in its upper position, the output signal S becomes H. The signal S is synchronized by an FF 12 to be a frequency conversion instruction signal $C_A$. The oscillation frequency of oscillation circuit 6 is 24 MHz. Deleting ratio control circuit 7 controls deleting ratio control signal 10 by the frequency conversion instruction signal $C_A$, i.e., the value of the Q output of FF 12. A clock pulse ON/OFF control circuit 11 is provided by an OR gate in this embodiment. Input 12 of OR gate 11 is supplied with an output CLKI of oscillation circuit 6, and this output is enabled or disabled by deleting ratio control signal 10 at the other input. When deleting ratio control signal 10 is L, CLKI passes OR gate 11 as it is to be the signal CLKO 3. When deleting ratio control signal 10 is H, the output of OR gate 11 becomes H independent of CLKI, and CLKI cannot pass OR gate 11. In other words, the output of oscillation circuit 6 can or cannot pass clock pulse ON/OFF control circuit 11 depending on the value of deleting ratio control signal 10.

The D input of FF 8 is always L when the frequency conversion instruction signal $C_A$=L and, accordingly, deleting ratio control signal 10 is always L. At this time, CLKI always passes OR gate 11 and CLKO agrees with CLKI. In other words, the frequency of CLKO becomes 24 MHz. When the frequency conversion instruction signal $C_A$=H, FF 8 functions as a frequency bisecting circuit, and the frequency conversion instruction signal $C_A$ is inverted at the edge of each rise of the CLKI pulse and repeats H and L at each CLKI pulse. When deleting ratio control signal 10 is L, CLKI passes OR gate 11 but cannot pass OR gate 11 when deleting ratio control signal 10 is H. Accordingly, every two pulses of CLKI are deleted by OR gate 11, and only a half of the CLKI pulses pass the same. Also, the frequency of CLKO becomes 12 MHz.

The operation of the clock control circuit of FIG. 29A is as follows. When switch 5 is in its lower position, all the pulses of the output CLKI pass OR gate 11, and the frequency of CLKO becomes 24 MHz. When switch 5 is in its upper position, half of the CLKI pulses are deleted by OR gate 11, and the frequency of CLKO becomes 12 MHz. In other words, when the deleting ratio by deleting ratio control circuit 7 is 0%, (enabled 100%), CLKO=CLKI. When the deleting ratio is 50% (enabled 50%), CLKO=($\frac{1}{2}$)×CLKI.

FIG. 29E illustrates the operation described above relative to a timing diagram. FIG. 29B illustrates the relationship between the frequency conversion instruction signal $C_A$ and CLKO in a table. FIGS. 29C and 29D respectively illustrate the state transitions and conversion table for deleting ratio control circuit 7.

FIG. 30 is an embodiment of clock frequency instruction means for producing clock frequency instruction signals $C_D$, $C_C$, $C_B$, $C_A$. In this embodiment, clock frequency instruction means 301 has register 300 which can be set by a program. Accordingly, while the CPU is running, the frequency of the CPU clock can be optionally changed by a program.

Personal computer makers are incessantly designing new products of higher performance. Recent CPUs and memories have been much speeded up, and to design a new product, improvement of its processing speed is most important. To increase the processing speed, the clock frequency of the CPU is increased, and memories having an operational speed agreeable therewith are used. But one serious problem still remains. The problem is the timing of signal to be supplied to the option slot for an expansion board to be connected to. A number of expansion boards associated with the conventional products have been prevailed by third parties and personal computer makers themselves. Then the personal computer manufacturer has to design timings of a signal for the option slot so that the expansion board associated with the conventional products. Usually the conventional products have lower operational speeds than new products, and accordingly the expansion boards have lower operational speeds agreeable with the conventional speeds. The operational speed at the option slot has to be decreased. To this end, conventionally the wait method of inserting a wait has been used. This method is effective to agree easily only bus cycle periods with the option board but is ineffective to agree the timings of the respective signals with those of the expansion board at the option slot. Some expansion boards do not work. In contrast to this, in this invention, the clock of the CPU is dynamically switched in accordance with bus cycles. In this so-called dynamic clock change method, the CPU clock is decreased for the bus cycles related with an option slot to make the clock frequency equal to that at which the CPU of a conventional product accessed the option slot. This method perfectly agrees the timings of the signals of a new products with those of a conventional product at the option slot. Thus, all the expansion boards produced for the conventional products can operate on new products.

In other words, this invention makes it possible to produce new product of higher speeds than the conventional products, while designing personal computers having compatibility with the conventional products, i.e., very high interchangeability with expansion boards.

Designing a system using a microprocessor incorporating the function of dynamically switching the internal operational clock for respective bus cycles also produces the following merits. This will be explained with reference to FIG. 3.

The frequencies of the internal operational clock of microprocessor 31 are 12 MHz and 8 MHz. But it is assumed that accompanying the progress of the semiconductor device technique, it has become possible to make a microprocessor having internal operational clock frequencies of 16 MHz and 8 MHz, and based on this assumption the design of a new product will be discussed below. The clock frequency for the memory bus cycles with respect to the address region A and the I/O bus cycle with respect to the address region C is 16 MHz, and the clock frequency for the memory bus cycles with respect to the address region B and for the I/O bus cycles with respect to the address region D is 8 MHz. In both microprocessors, the timings for the signals to memory device 33 and I/O device 35 are the same, i.e., 8 MHz. Memory device 33 and I/O device 35 can be used as they are, without redesign. In other words, only memory device 32 and I/O device 34 need to be redesign. The burden of the development of the new product is, therefore, significantly decreased via an efficient design.

As apparent in comparison of FIG. 29A illustrating an embodiment with FIG. 35A illustrating the conventional art, the use of the clock control circuit according to this invention can decrease the oscillation frequency of the oscillation circuit and the size of the circuit for generating the CPU clock can be significantly decreased. Further, this invention provides remarkable advantageous effects in that inaccurate clock waveforms are reduced to a negligible minimum if not eliminated.

While the invention has been described in conjunction with several specific embodiments, it is evident to those skilled in the art that many further alternatives, modifications and variations will be apparent in light of the foregoing description. Thus, the invention described herein is intended to embrace at such alternatives, modifications, applications and variations as fall within the spirit and scope of the appended claims.

What is claimed is:

1. A computer system having a variable frequency microprocessor clock generator, said computer system comprising:

a central processor unit (CPU) comprising a microprocessor, wherein said microprocessor generates a plurality of address signals and outputs said address signals onto a plurality of address bus terminals, receives and transmits data via a plurality of data bus terminals, generates a plurality of bus control signals and outputs said bus control signals onto a plurality of bus control signal terminals, said microprocessor further comprising a clock signal input terminal;

a bus control signal decoder circuit having input terminals and output terminals, that receives said bus control signals via said bus control signal decoder circuit input terminals and that produces a first plurality of output signals wherein at least one of said first plurality of output signals indicates a memory read bus cycle, at least one of said first plurality of output signals indicates a memory write bus cycle, at least one of said first plurality of output signals indicates an Input/Output (I/O) read bus cycle, and at least one of said first plurality of output signals indicates an I/O write bus cycle, and wherein said bus control signal decoder circuit input terminals are coupled to said bus control signal terminals of said microprocessor;

a clock divider circuit that receives, via a frequency division control signal input terminal, a frequency division control signal having two states, and that further receives, via a first clock signal input terminal, a first clock signal having a first frequency, and that generates a second clock signal that is output via a second clock signal output terminal, wherein said second clock signal has a frequency which is one-half of said first frequency when said frequency division control signal is in a first one of said two states and said second clock signal has a frequency which is one-third of said first frequency when said frequency division control signal is in a second one of said two states, wherein said second clock signal is coupled to said clock signal input of said microprocessor;

a frequency division ratio determination circuit coupled to said plurality of bus control signal terminals, said frequency division ratio determination circuit operable, in response to said plurality of bus control signals received from said plurality of said bus control signal terminals, to provide via a frequency division control signal output terminal, said frequency division control signal having two states, wherein said frequency division control signal output terminal is coupled to said frequency division control signal input terminal of said clock divider circuit; and an oscillator circuit, coupled to said clock divider circuit, operable to produce said first clock signal.

2. The computer system of claim 1 wherein said CPU, said clock divider circuit, and said frequency division ratio determination circuit are integrated on a single integrated circuit chip.

3. The computer system of claim 1, wherein said clock divider circuit comprises a pulse deletion means for deleting pulses from said first clock signal.

4. A computer system having a variable frequency microprocessor clock generator, said computer system comprising:

a central processor unit (CPU) comprising a microprocessor, wherein said microprocessor generates a plurality of address signals and outputs said address signals onto a plurality of address bus terminals, receives and transmits data via a plurality of data bus terminals, generates a plurality of bus control signals and outputs said bus control signals onto a plurality of bus control signal terminals, said microprocessor further comprising a clock signal input terminal;

a bus control signal decoder circuit having input terminals and output terminals, that receives said bus control signals via said bus control signal decoder circuit input terminals and that produces a first plurality of output signals wherein at least one of said first plurality of output signals indicates a memory read bus cycle, at least one of said first plurality of output signals indicates a memory write bus cycle, at least one of said first plurality of output signals indicates an Input/Output (I/O) read bus cycle, and at least one of said first plurality of output signals indicates an I/O write bus cycle, and wherein said bus control signal decoder circuit input terminals are coupled to said bus control signal terminals of said microprocessor;

a clock divider circuit that receives, via a frequency division control signal input terminal, a frequency division control signal and that further receives, via a first clock signal input terminal, a first clock signal having a first frequency, said clock divider circuit responsive to said frequency division control signal such that a second clock signal is output from said clock divider circuit via a second clock signal output terminal, wherein said second clock signal has a frequency which is equal to or less than said first frequency, and wherein said second clock signal output terminal is coupled to said clock signal input terminal of said microprocessor;

a frequency division ratio determination circuit coupled to said plurality of bus control signal terminals, said frequency division ratio determination circuit operable, in response to said plurality of bus control signals received from said plurality of said bus control signal terminals, to provide via a frequency division control signal output terminal, said frequency division control signal, wherein said frequency division control signal output terminal is coupled to said frequency division control signal input terminal of said clock divider circuit; and an oscillator circuit, coupled to said clock divider circuit, operable to produce said first clock signal.

5. The computer system of claim 4, wherein said clock divider circuit comprises a pulse deletion means for deleting pulses from said first clock signal.

* * * * *